(12) United States Patent
Novak et al.

(10) Patent No.: US 8,366,356 B2
(45) Date of Patent: Feb. 5, 2013

(54) QUICK CHANGE ARBOR, HOLE CUTTER, AND METHOD

(75) Inventors: Joseph Thomas Novak, East Longmeadow, MA (US); James E. Pangerc, Williamston, SC (US)

(73) Assignee: Irwin Industrial Tool Company, Huntersville, NC (US)

(*) Notice: Subject to any disclaimer, the term of this patent is extended or adjusted under 35 U.S.C. 154(b) by 1005 days.

(21) Appl. No.: 12/399,880

(22) Filed: Mar. 6, 2009

(65) Prior Publication Data

US 2009/0279972 A1    Nov. 12, 2009

Related U.S. Application Data

(63) Continuation-in-part of application No. 12/043,740, filed on Mar. 6, 2008.

(51) Int. Cl.
*B23B 51/04* (2006.01)
(52) U.S. Cl. .................................... 408/204; 408/239 R
(58) Field of Classification Search .......... 408/204–209, 408/238, 239 A, 239 R, 233; *B23B 51/04, B23B 51/05*
See application file for complete search history.

(56) References Cited

U.S. PATENT DOCUMENTS

| | | |
|---|---|---|
| 3,784,316 A | 1/1974 | Bittern |
| 4,036,560 A | 7/1977 | Clark et al. |
| 4,148,593 A | 4/1979 | Clark |
| 4,303,357 A | 12/1981 | Makar |
| 4,490,080 A | 12/1984 | Kezran |
| 4,651,600 A | 3/1987 | Zettl |
| 4,968,189 A * | 11/1990 | Pidgeon ................ 408/1 R |
| 5,035,548 A | 7/1991 | Pidgeon |
| 5,076,741 A | 12/1991 | Littlehorn |
| 5,108,235 A | 4/1992 | Czyzewski |
| 5,154,552 A | 10/1992 | Koetsch |
| 5,226,762 A | 7/1993 | Ecker |
| 5,246,317 A | 9/1993 | Koetsch et al. |
| 5,352,071 A | 10/1994 | Cochran et al. |
| 5,658,102 A | 8/1997 | Gale |
| 5,813,802 A | 9/1998 | Ajimi et al. |
| 5,868,532 A | 2/1999 | Spenser |
| 6,120,221 A | 9/2000 | Alm |
| 6,341,925 B1 | 1/2002 | Despres |
| 6,623,220 B2 | 9/2003 | Nuss et al. |
| 6,641,338 B2 | 11/2003 | Despres |

(Continued)

FOREIGN PATENT DOCUMENTS

| | | |
|---|---|---|
| EP | 0 589 108 A1 | 3/1994 |
| GB | 2 295 110 A | 5/1996 |

(Continued)

OTHER PUBLICATIONS

International Search Report and Written Opinion of the International Searching Authority for International Application No. PCT/US2009/036413, dated Jun. 24, 2009.

*Primary Examiner* — Daniel Howell
(74) *Attorney, Agent, or Firm* — McCarter & English, LLP

(57) ABSTRACT

An arbor for quick change and standard hole cutters, wherein each hole cutter includes a central aperture and at least one drive pin aperture. The arbor comprises an arbor body including an end portion engageable within the central aperture, a drive shank opposite the end portion for engaging a power tool, and an aperture for receiving a pilot bit. The arbor further comprises a drive pin plate and/or collar having at least one drive pin receivable in a corresponding drive pin aperture of the hole saw for drivingly engaging the hole saw. The arbor, in at least one embodiment, further comprises a pilot bit mechanism for engaging and releasing a quick change or standard pilot bit.

23 Claims, 15 Drawing Sheets

SECTION A-A

U.S. PATENT DOCUMENTS

| | | |
|---|---|---|
| 6,705,807 B1 | 3/2004 | Rudolph et al. |
| 7,001,119 B2 | 2/2006 | Wendzina et al. |
| 7,073,992 B2 | 7/2006 | Korb et al. |
| 7,104,738 B2 | 9/2006 | Cantlon |
| 7,219,753 B2 | 5/2007 | Gaul |
| 7,488,146 B2 | 2/2009 | Brunson |
| 2002/0122703 A1 | 9/2002 | Czyzewski et al. |
| 2002/0131835 A1 | 9/2002 | Despres |
| 2005/0025591 A1 | 2/2005 | Korb et al. |
| 2007/0036620 A1 | 2/2007 | Keightley |
| 2007/0071565 A1 | 3/2007 | Singh et al. |
| 2007/0160434 A1 | 7/2007 | Gillissen |
| 2007/0160435 A1 | 7/2007 | Chao |
| 2007/0212179 A1 | 9/2007 | Khangar et al. |
| 2008/0019785 A1 | 1/2008 | Keightley |

FOREIGN PATENT DOCUMENTS

| | | |
|---|---|---|
| JP | 57-201114 A | 12/1982 |
| JP | 07-241840 A | 9/1995 |
| JP | 7241840 A | 9/1995 |
| JP | 9117814 A | 5/1997 |
| JP | 2002096222 | 4/2002 |
| JP | 2004181622 A | 7/2004 |
| JP | 2004216508 A | 8/2004 |
| JP | 2006198699 A | 8/2006 |
| WO | WO 03/024677 A1 | 3/2003 |
| WO | WO 2004/011179 A1 | 2/2004 |
| WO | WO 2005/120754 A1 | 12/2005 |
| WO | WO 2008/064409 A1 | 6/2008 |

* cited by examiner

SECTION A-A

SECTION B-B

QUICK CHANGE ARBOR, HOLE CUTTER, AND METHOD

CROSS-REFERENCE TO RELATED APPLICATIONS

This application is a continuation-in-part of U.S. patent application Ser. No. 12/043,740, filed Mar. 6, 2008, the contents of which are hereby incorporated by reference in their entirety as part of the present disclosure.

FIELD OF THE INVENTION

The present invention relates arbors for hole cutters, hole cutters, and related methods, and more particularly, to arbors, hole cutters and related methods facilitating relatively quick attachment and release of a hole cutter and/or pilot bit to and from the arbor.

BACKGROUND

A typical arbor for a hole saw includes an arbor body with a threaded end portion that engages a corresponding threaded aperture in the end plate of the hole saw to secure the hole saw to the arbor. A pilot drill bit is receivable within the threaded end portion of the arbor body and extends through the center of the hole saw. The arbor further includes a drive pin plate that slidably mounts to the arbor body and has a pair of diametrically opposed drive pins that extend into corresponding drive pin holes formed in the end plate of the hole saw to rotatably drive the hole saw. A lock nut is threadedly mounted on the arbor body to prevent disengagement of the drive pins from the hole saw during use.

To mount the hole saw to the arbor, the end plate of the hole saw is threaded onto the threaded end portion such that the hole saw is secured to the arbor body and the drive pin holes are in alignment with the corresponding drive pins of the drive pin plate. Then the lock nut is tightened until the drive pins are fully received by the drive pin holes to secure the arbor to the hole saw. To mount the pilot bit, the bit is inserted into the center hole and secured by tightening a fastener.

One of the drawbacks associated with this type of arbor is that hole saws will lock up on the threads if the drive pin plate disengages from the hole saw during operation, presenting the end user with a difficult and time consuming task of removing the hole saw from the arbor. In many circumstances, the process of removing a locked up hole saw from the arbor permanently damages the arbor, the hole saw or both, necessitating the unwanted expense associated with replacing equipment prematurely.

Another drawback of this type of arbor is that it can be necessary to hold the hole saw in place to maintain alignment of the drive pin holes with the corresponding drive pins while simultaneously tightening the lock nut to avoid rotation of the hole saw that otherwise would prevent the drive pins from entering the drive pin holes. To address this problem, proprietary arbors have been devised that accept corresponding proprietary hole saws specifically designed to make hole saw mounting an easier task. However, the versatility of these arbors is greatly limited because they can only mount the particular manufacturer's proprietary hole saws and are not able to mount standard hole saws. Accordingly, it would be advantageous for such proprietary arbors to accept standard hole saws because they tend to be readily available in the event a proprietary hole saw needs replacing and is not available, or in the event a proprietary hole saw is not available in a desired size and/or cutting configuration.

Still another drawback of this type of arbor is that the process of inserting and removing pilot drill bits frequently requires the end user to manually engage a set screw. To address this issue, proprietary arbors have been devised that secure corresponding proprietary pilot drill bits having shanks configured for securement without the necessity of tools. However, the versatility of these arbors is greatly limited because they can only secure the particular manufacturer's proprietary pilot drill bits, and are not able to secure standard pilot drill bits which are readily available and easily obtainable in the event a proprietary pilot drill bit needs replacing and is not available, or in the event a proprietary pilot drill bit is not available in a desired size and/or drilling configuration. Further, such proprietary arbor and pilot drill bit systems can fail at fully securing the bits inside the arbor and/or can allow the bits to loosen during use causing off-axis wobble, especially at high rotational speeds. Off-axis wobble can cause undesirable vibration of the pilot drill bit that can reduce the drilling life of the bit and/or create an unacceptable degree of inaccuracy during use.

Accordingly, it is an object of the present invention to overcome one or more of the above-described drawbacks and/or disadvantages of the prior art.

SUMMARY OF THE INVENTION

In accordance with a first aspect, the present invention is directed to an arbor that is connectable to a quick change hole cutter, and in some embodiments of the present invention, also is connectable to a standard hole cutter. The hole cutter includes an end portion defining a first aperture, and at least one drive pin recess radially spaced relative to the first aperture. The arbor comprises an arbor body including a stop surface, and a hole cutter connecting portion extending axially from the stop surface and engageable within the first aperture of the hole cutter. A drive pin member defines a second aperture that receives therethrough the arbor body, and is configured to allow relative axial movement, but to prevent relative rotational movement, of the arbor body and drive pin member. The drive pin member further includes a first surface, and at least one drive pin radially spaced relative to the second aperture and extending axially from the first surface. The connecting portion is receivable within the first aperture of the hole cutter to define a first engagement position. The arbor body and/or the hole cutter is movable relative to the other between the first engagement position and a second engagement position to secure the hole cutter to the arbor body. In the second engagement position: (i) the at least one drive pin is substantially aligned with the at least one corresponding drive pin recess of the hole cutter; and (ii) the drive pin member is movable axially relative to the arbor body between a disengaged position axially spaced relative to the hole cutter, and an engaged position wherein the at least one drive pin is received within the corresponding drive pin recess of the hole cutter, and the first surface of the drive pin member contacts the end portion of the hole cutter.

Preferably, in the second engagement position, the end portion of the hole cutter is in contact with the stop surface of the arbor body. In some embodiments of the present invention, the arbor body and/or hole cutter is rotatable relative to the other between the first and second engagement positions. In some such embodiments, the connecting portion of the arbor body defines a first thread, and the first aperture of the hole cutter defines a second thread that is threadedly engageable with the first thread, to fixedly secure the hole cutter to the arbor body in the second engagement position. In some such embodiments, the threads on the connecting portion of the arbor body are configured to both (i) substantially align the at least one drive pin with the corresponding drive pin recess of the hole cutter in the second engagement position, and (ii) place the end portion of the hole cutter in contact with the stop surface of the arbor body in the second engagement position. In some such embodiments, the first and second threads define an axial clearance therebetween allowing the end portion of the hole cutter to substantially contact the stop surface of the arbor body in the both the first engagement position and the second engagement position. In some such embodiments, the arbor body and/or hole cutter is rotatable relative to the other between the first and second engagement positions, and the angular extent between the first and second engagement positions is within the range of about 10° and about 180°.

In some embodiments of the present invention, the first aperture of the quick change hole cutter defines a plurality of angularly extending protrusions, and a plurality of relatively recessed portions formed therebetween; and the connecting portion of the arbor body defines a plurality of angularly extending protrusions, and a plurality of relatively recessed portions formed therebetween. In the first engagement position, the protrusions of the connecting portion are received within the recesses of the first aperture, and the protrusions of the first aperture are received within the recessed portions of the connecting portion. In the second engagement position, the protrusions of the connecting portion are engaged with the protrusions of the first aperture. In some such embodiments, the protrusions of the connecting portion define a first thread, the protrusions of the first aperture define a second thread, and the first and second threads are threadedly engaged with each other in the second engagement position. In some embodiments, at least one of the angularly extending protrusions defines a greater or lesser angular extent than at least one other angular extending protrusion of the respective first aperture and connecting portion, to thereby permit receipt of the connecting portion within the first aperture in only the first engagement position.

Some embodiments of the present invention further comprise a collar coupled to the drive pin member, wherein movement of the collar between a first position and second position substantially simultaneously moves the drive pin member from the engaged to the disengaged position. Preferably, the collar defines an approximate diabolo shape. One advantage of this feature is that it facilitates handling during use by permitting the user to grasp the middle portion of the collar with, for example, an index finger and thumb of one hand, when moving the collar to attach or remove a hole cutter.

In some embodiments of the present invention, an axially elongated bearing surface is defined by the interface between the collar and the arbor body. One advantage if this feature is that it reduces or prevents unwanted play or movement between the collar and drive pin member, and the arbor body.

Some embodiments of the present invention further comprise a biasing member, such as a coil spring, that normally biases the drive pin member in the direction from the disengaged into the engaged position. Preferably, the biasing member automatically drives the drive pin member into the engaged position upon moving the hole cutter into the second engagement position. One advantage of this feature is that it facilitates one-handed attachment of the hole cutter to the arbor, or otherwise facilitates rapid attachment and detachment of the hole cutter to and from the arbor.

In accordance with another aspect of the present invention, the arbor body further defines a pilot bit aperture that is configured to alternatively receive both a quick change pilot bit and a standard pilot bit. In some such embodiments, the arbor further comprises (i) a pilot pin biased radially inwardly toward the pilot bit aperture and engageable with a quick change pilot bit received within the pilot bit aperture, and (ii) a fastener movable into the pilot bit aperture and engageable with a standard pilot bit received within the pilot bit aperture.

In some such embodiments, the arbor body further defines a pilot bit aperture for alternatively receiving both a quick change pilot bit and a standard pilot bit, and the arbor further comprises a pilot bit mechanism defining (i) a first state wherein the pilot bit mechanism engages the quick change pilot bit to prevent movement of the bit relative to the arbor body; (ii) a second state wherein the pilot bit mechanism engages the standard pilot bit to prevent movement of the bit relative to the arbor body; and (iii) a third state wherein the pilot bit mechanism disengages from the respective quick change pilot bit or standard pilot bit and allows movement of the respective bit relative to the arbor body.

In accordance with another aspect, the present invention is directed to an arbor that is connectable to a quick change hole cutter including an end portion defining a first aperture and at least one recess radially spaced relative to the first aperture. The arbor comprises first means for drivingly connecting a power tool to the hole cutter. The first means includes a stop surface, and second means of the arbor extends axially relative to the stop surface for releasably engaging the first aperture of the hole cutter and defining a first engagement position. Third means are provided for receiving therethrough the first means, and for allowing relative axial movement, but preventing relative rotational movement, of the first means and the third means. The third means includes a first surface, and at least one fourth means extending axially from the first surface for receipt within the at least one recess of the hole cutter for rotatably driving the hole cutter. Fifth means are provided for allowing rotational movement of at least one of the first means and the hole cutter relative to the other between the first engagement position and a second engagement position for securing the hole cutter to the first means, and for (i) substantially aligning the at least one fourth means with the at least one corresponding recess of the hole cutter in the second engagement position to, in turn, allow axial movement of the third means relative to the first means in the second engagement position between a disengaged position axially spaced relative to the hole cutter, and an engaged position with the at least one fourth means received within the corresponding recess of the hole cutter, and (ii) placing the first surface of the third means in substantial contact with the stop surface of the hole cutter in the second engagement position.

In accordance with another aspect, the present invention is directed to a quick change hole cutter that is attachable to an arbor. The arbor includes a threaded end portion defining at least one male threaded portion, a stop surface located adjacent to the threaded end portion, and a drive pin member including at least one drive pin thereon and movable axially relative to the arbor between an engaged position with the drive pin engaging the hole cutter, and a disengaged position with the drive pin disengaged from the hole cutter. The quick change hole cutter comprises a blade including a blade body and a cutting edge defined by a plurality of cutting teeth. An end portion of the hole cutter is fixedly secured to the blade body, and defines an approximately central aperture including on a peripheral portion thereof at least one female threaded portion, and at least one drive pin recess radially spaced relative to the central aperture. The female threaded portion cooperates with the male threaded portion of the arbor to define (i) a first engagement position wherein the lead male and female threads engage or substantially engage one another and define a first axial clearance relative to each other, and (ii) a second engagement position angularly spaced relative to the first engagement position. In the second engagement position, the male and female threads engage one another and define a second axial clearance less than the first axial clearance, the end portion is in engagement or substantial engagement with the stop surface of the arbor, and the drive pin recess is aligned with a respective drive pin of the arbor for receiving the drive pin with the drive pin member located in the engaged position.

Preferably, in the second engagement position, the end portion of the hole cutter is in contact with the stop surface of the arbor body. In some embodiments of the present invention, the female threaded portion defines an axial clearance relative to the male threaded portion allowing the end portion of the hole cutter to substantially contact the stop surface of the arbor body in the both the first engagement position and the second engagement position. In some embodiments, the connecting portion of the arbor body defines a plurality of angularly extending protrusions and a plurality of relatively recessed portions formed therebetween; and the central aperture of the quick change hole cutter defines a plurality of angularly extending protrusions, and a plurality of relatively recessed portions formed therebetween. In the first engagement position, the protrusions of the arbor connecting portion are received within the recesses of the central aperture, and the protrusions of the central aperture are received within the recessed portions of the arbor connecting portion. In the second engagement position, the protrusions of the arbor connecting portion are engaged with the protrusions of the central aperture.

In accordance with another aspect, the present invention is directed to a quick change hole cutter that is attachable to an arbor. The arbor includes a threaded end portion defining at least one male threaded portion, a stop surface located adjacent to the threaded end portion, and a drive pin member including at least one drive pin thereon and movable axially relative to the arbor between an engaged position with the drive pin engaging the hole cutter, and a disengaged position with the drive pin disengaged from the hole cutter. The quick change hole cutter comprises first means for cutting a hole, and second means for releasably connecting the first means to the arbor. The second means includes third means for engaging the end portion of the arbor in a first engagement position defining a first axial clearance therebetween, allowing relative rotational movement of the hole cutter and/or arbor relative to the other between the first engagement position and a second engagement position angularly spaced relative to the first engagement position, and defining a second axial clearance therebetween less than the first axial clearance, and for placing the second means in engagement or substantial engagement with the stop surface of the arbor. Fourth means of the hole cutter are aligned with the drive pin of the arbor in the second engagement position for receiving the drive pin with the drive pin member located in the second engaged position.

In accordance with another aspect, the present invention is directed to a method comprising the following steps:

(i) providing an arbor including a connecting portion that is connectable to a quick change hole cutter, wherein the hole cutter includes an end portion defining a first aperture and at least one drive pin recess radially spaced relative to the first aperture, and the arbor includes an axially-elongated arbor body and a drive pin member movable axially, but not rotationally, relative to the arbor body, and including at least one drive pin extending therefrom;

(ii) inserting the connecting portion of the arbor body into the first aperture of the hole cutter to define a first engagement position;

(iii) moving the arbor body and/or hole cutter relative to the other between the first engagement position and a second engagement position and, in turn, securing the hole cutter to the arbor body; and (iv) upon moving the arbor body and/or hole cutter relative to the other into the second engagement position, (i) substantially aligning the at least one drive pin with the at least one corresponding drive pin recess of the hole cutter in the second engagement position, and then either moving or allowing axial movement of the drive pin member relative to the arbor body between a disengaged position axially spaced relative to the hole cutter, and an engaged position with the at least one drive pin axially received within the corresponding drive pin recess of the hole cutter and, in turn, placing the drive pin member in substantial contact with the end portion of the hole cutter.

In some embodiments of the present invention, the method further comprises the steps of:

(i) providing a quick change hole cutter including a first aperture defining along a periphery thereof a plurality of angularly extending protrusions and a plurality of recesses formed therebetween;

(ii) providing an arbor having a connecting portion defining a plurality of angularly extending protrusions and a plurality of recesses formed therebetween;

(iii) inserting at least one of the protrusions of the connecting portion and the protrusions of the first aperture into the recesses of the other in the first engagement position; and (iv) rotating at least one of the hole cutter and arbor body relative to the other from the first engagement position to the second engagement position and, in turn, engaging at least one of the protrusions of the connecting portion and of the first aperture with the other.

Some embodiments of the present invention further comprise the steps of normally biasing the drive pin member in the direction from the disengaged position toward the engaged position, and upon moving the hole cutter from the first engagement position into the second engagement position, automatically biasing the drive pin member into the engaged position to, in turn, drive the drive pin(s) into the corresponding drive pin recess(es) and attach the hole cutter to the arbor.

In accordance with another aspect, the present invention is direct to an arbor for a hole cutter including an outer surface defining a threaded aperture, and a drive member aperture spaced radially relative to the threaded aperture. The arbor comprises an axially-elongated arbor body including a drive shank on one end thereof, a threaded portion on an opposite end thereof relative to the drive shank that is engageable with the threaded aperture on the hole cutter, and an inner axially-extending bearing surface located between the drive shank and the threaded portion. The arbor body defines a first width, such as a diameter, along the inner axially-extending bearing surface. The arbor further comprises an axially-elongated collar including a proximal end and a distal end, a manually engageable surface extending axially between the proximal and distal ends and defining a reduced width in comparison to the proximal and distal ends, and a drive member, such as a plurality of angularly spaced drive pins, extending axially from the distal end of the collar. The collar is slidably mounted on the arbor body and movable between (i) an engaged position with the distal end of the collar adjacent to the threaded portion for engaging the drive member with the drive member aperture of a hole cutter threadedly attached to the threaded portion of the arbor body, and (ii) a disengaged position with the distal end of the collar axially spaced relative to the threaded portion of the arbor body. The collar includes an outer axially-extending bearing surface that slidably contacts the inner axially-extending bearing surface of the arbor when moving the collar between the engaged and disengaged positions, and the inner axially-extending bearing surface defines a length that is at least about 1¼ times the first width, such as the diameter, of the arbor body. The arbor further comprises a retaining member mounted on the collar and movable between (i) a first position holding the collar in the engaged position, and (ii) a second position allowing axial movement of the collar from the engaged position to the disengaged position.

In some embodiments of the present invention, the axially-extending bearing surface defines a length that is at least about 1½ times the first width, such as the diameter, of the arbor body.

In some embodiments of the present invention, the arbor body defines a pair of inner axially-extending bearing surfaces angularly spaced relative to each, and a pair of inner curvilinear axially-extending bearing surfaces angularly spaced relative to each other between inner axially-extending bearing surfaces. The collar defines a pair of outer axially-extending bearing surfaces angularly spaced relative to each other, and a pair of outer curvilinear axially-extending bearing surfaces angularly spaced relative to each other between outer axially-extending bearing surfaces. The pair of inner axially-extending bearing surfaces slidably engage the pair of outer axially-extending bearing surfaces, and the pair of inner curvilinear axially-extending bearing surfaces slidably engage the pair of outer curvilinear axially-extending bearing surfaces, when moving the collar between the engaged and disengaged positions. Preferably, the pair of inner axially-extending bearing surfaces are substantially flat, and the pair of outer axially-extending bearing surfaces are substantially flat.

In some such embodiments, each curvilinear axially-extending bearing surface is defined by a diameter of the collar or arbor body, respectively. In some embodiments of the present invention, the outer axially-extending bearing surfaces are shorter than the inner axially-extending bearing surfaces. In some such embodiments, the collar defines a pair of axially-extending recessed surfaces located on substantially opposite sides of the collar relative to each other, and each recessed surface extends between a respective inner axially-extending bearing surface and the proximal end of the collar. In some such embodiments, the collar further defines a pair of first stop surfaces. Each first stop surface is formed between an axially-extending recessed surface and respective inner axially-extending bearing surface. The arbor body defines a pair of second stop surfaces, each second stop surface is formed at a proximal end of a respective inner axially-extending bearing surface, and first and second stop surfaces engage each other in the disengaged position to prevent further proximal axial movement of the collar. In some such embodiments, the second stop surfaces are defined by respective lips formed on the arbor body, and the lips and recessed surfaces form bearing surfaces that slidably contact each other when moving the collar between the engaged and disengaged positions.

One advantage of some currently preferred embodiments of the present invention is that the collar defines axially-elongated bearing surfaces that are at least about 1¼ times as long as the diameter of the arbor body to thereby provide extensive bearing surfaces and, in turn, substantially prevent any rocking or wobble of the hole cutter on the arbor body. Yet another advantage is that the collar defines an axially-extending manually engageable surface to facilitate manually engagement and movement of the collar between the disengaged and engaged positions in a single, one-handed motion.

Another advantage of some currently preferred embodiments of the present invention is that they enable a hole cutter to be relatively quickly engaged with, and disengaged from, the arbor. Yet another advantage of some currently preferred embodiments of the present invention is that they enable one arbor to accept both quick change and standard hole cutters.

Other objects, advantages and features of the present invention and/or of the currently preferred embodiments thereof will become more readily apparent in view of the following detailed description of the currently preferred embodiments and accompanying drawings.

DETAILED DESCRIPTION OF THE CURRENTLY PREFERRED EMBODIMENTS

Figure 10:
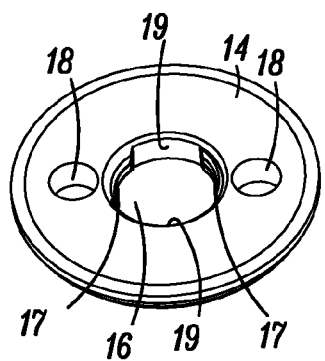
FIG. 10 is a perspective view of the end plate of a quick change hole saw of the present invention.

In FIGS. 1-4, an arbor embodying the present invention is indicated generally by the reference numeral 10. The arbor 10 is usable with hole cutters, such as hole saws and sheet metal hole cutters. The term "hole cutter" is used herein to mean any of numerous different types of cutting tools for cutting holes in work pieces, such as hole saws, sheet metal hole cutters, etc. The term "arbor" is used herein to mean any of numerous different types of devices for supporting a rotating tool, such as a hole cutter, on a power tool such as a drill, and further includes, without limitation, mandrels. As shown, for example, in FIGS. 4 and 10, a typical quick change hole cutter 12 includes an end plate 14 defining a hole cutter aperture 16 extending through a central portion of the end plate, and at least one drive pin aperture 18 radially spaced relative to the aperture 16. In the illustrated embodiment, there are two drive pin apertures 18 radially spaced relative to the aperture 16 and angularly spaced relative to each other by about 180°. However, as may be recognized by those of ordinary skill in the pertinent art based on the teachings herein, any number of drive pin apertures may be provided in any of a variety of shapes and/or configurations. As shown typically in FIG. 4, a blade 13 extends axially from the end plate 14 and defines a plurality of cutting teeth 15 for cutting a hole in a work piece by rotatably driving the arbor 10 and hole cutter 12 and moving the rotatably-driven cutting teeth 15 into the work piece. As described further below, in the quick change hole cutter, the aperture 16 defines a plurality of raised threaded portions 17 that are angularly spaced relative to each other for threadedly engaging a connecting end portion 22 of the arbor 10, and a plurality of recessed unthreaded portions 19 located between the threaded portions.

In a standard hole cutter or saw, on the other hand, the central aperture in the end plate or cap of the hole cutter defines a continuous or substantially continuous thread extending about the circumference of the aperture. Such standard hole cutters conform to the ASME B94.54-1999 standard, and in accordance with such ASME standard, define a standard thread form depending on the outside diameter of the hole saw as follows: For hole saws having outside diameters between 9/16 inch and 1 3/16 inches, the standard thread form is a 1/2-20 UNF-2B thread, and for hole saws having outside diameters between 1 1/4 inches and 6 inches, the standard thread form is a 5/8-18 UNF-2B thread. Accordingly, the term "standard" hole cutter is used herein to mean a hole cutter that has such a threaded aperture; whereas the term "quick change" hole cutter is used herein to mean a hole cutter that does not include a such a conventional threaded aperture, but rather includes a connecting aperture defining one or more features to facilitate a quick change attachment of the hole cutter to the arbor, such as the plural raised engagement portions and plural recessed portions located therebetween and described further below.

Figure 4:
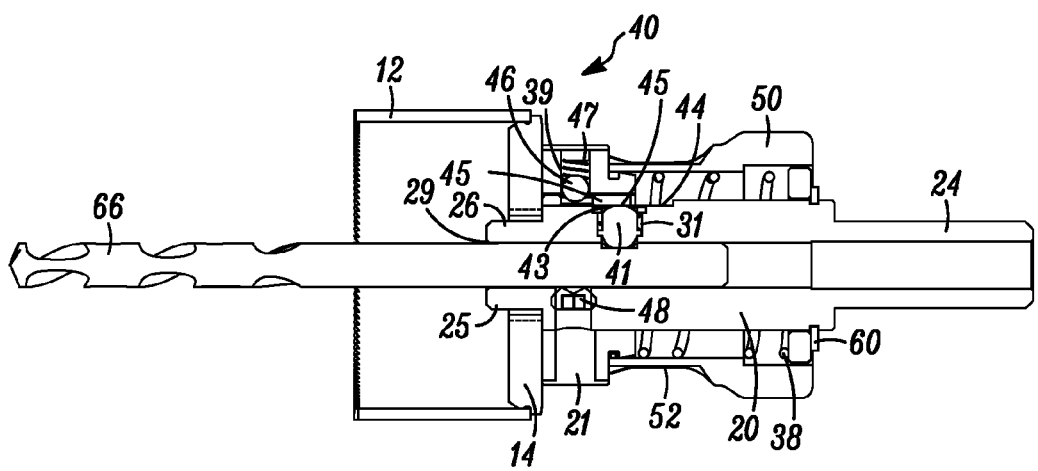
FIG. 4 is a cross-sectional view of the arbor of FIG. 1 further showing the pilot bit mechanism of the arbor in a first or quick change pilot bit state.
Figure 5:
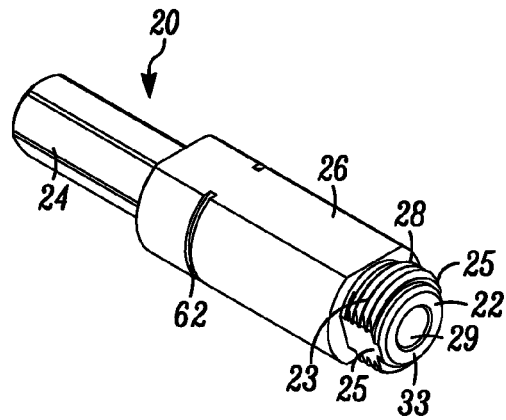
FIG. 5 is a perspective view of the arbor body of the arbor of FIG. 1.
Figure 6:
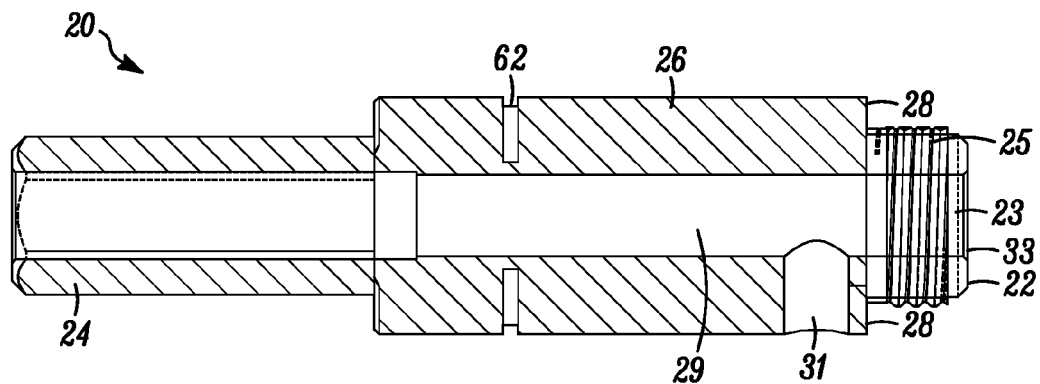
FIG. 6 is a cross-sectional view of the arbor body of FIG. 5.
Figure 7:
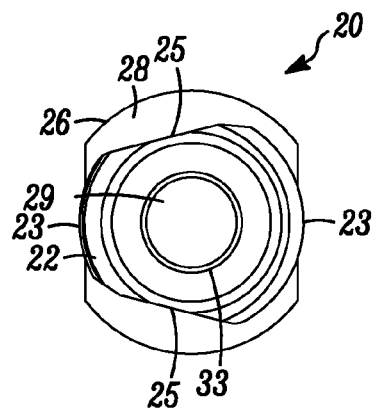
FIG. 7 is a front end view of the arbor body of FIG. 5.
Figures 18, 19:
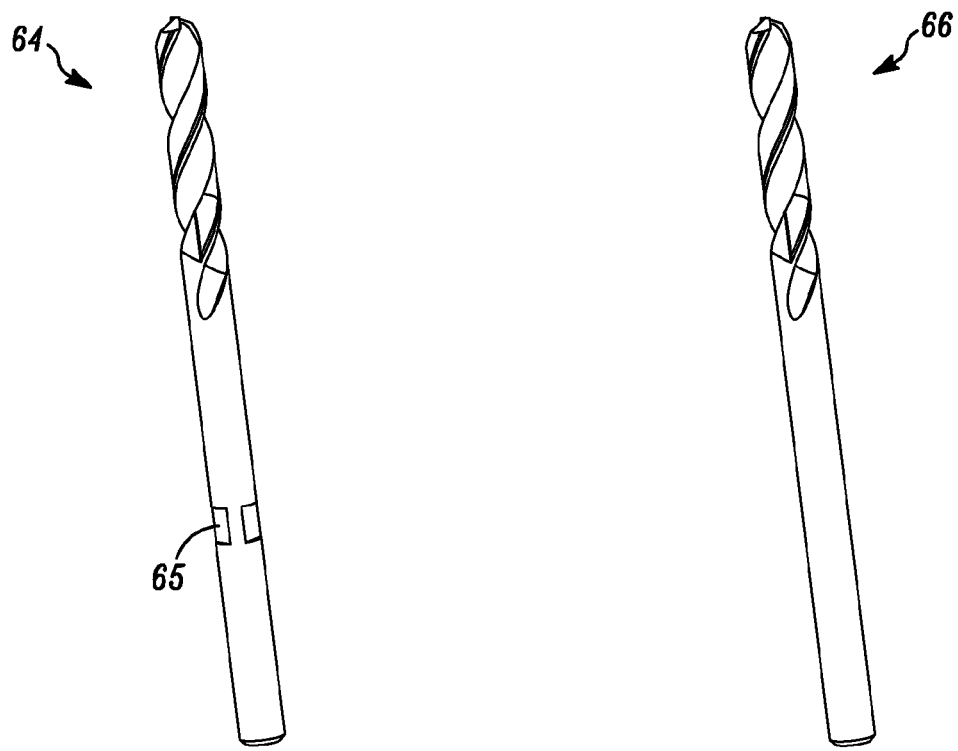
FIG. 18 is a perspective view of a quick change pilot bit.
FIG. 19 is a perspective view of a standard pilot bit.

As shown best in FIGS. 5-7, the arbor 10 comprises an axially-elongated arbor body 20 defining an axially extending pilot bit aperture 29 for receiving a pilot bit, such as a quick change pilot bit 64 (FIG. 18) or a standard pilot bit 66 (FIG. 19). A standard pilot bit is a pilot bit that does not include a feature for allowing attachment of the bit to an arbor without tools. The arbor body 20 includes a body portion 26 defining a stop surface 28, and an end portion 22 that extends axially from the stop surface 28 and defines an end surface 33. As described further below, the end portion 22 is engageable within the hole cutter aperture 16 (FIG. 4) to secure the arbor body to the hole cutter. In the illustrated embodiments, and as described further below, the end portion 22 threadedly engages the hole cutter aperture 16; however, as may be recognized by those of ordinary skill in the pertinent art based on the teachings herein, any of numerous other connection mechanisms or features that are currently known, or that later become known, equally may be employed. As can be seen in FIGS. 5-7, the body portion 26 of the arbor defines a "double D" cross-sectional configuration (i.e., a pair of opposing substantially flat side surfaces with a pair of opposing substantially curvilinear side surfaces extending therebetween); however, as may be recognized by those of ordinary skill in the pertinent art based on the teachings herein, this configuration is only exemplary, and numerous other shapes and/or configurations that are currently known, or that later become known equally may be used. A drive shank 24 is formed on the arbor body 20 opposite the end portion 22. In the illustrated embodiment, the drive shank 24 is a quick-release power drive shank of a type known to those of ordinary skill in the pertinent art. However, as may be recognized by those of ordinary skill in the pertinent art based on the teachings herein, the shank 24 may take the form of any of numerous different types of shanks or other structures that are currently known, or that later become known for performing the function of the shank 24.

Figure 1:
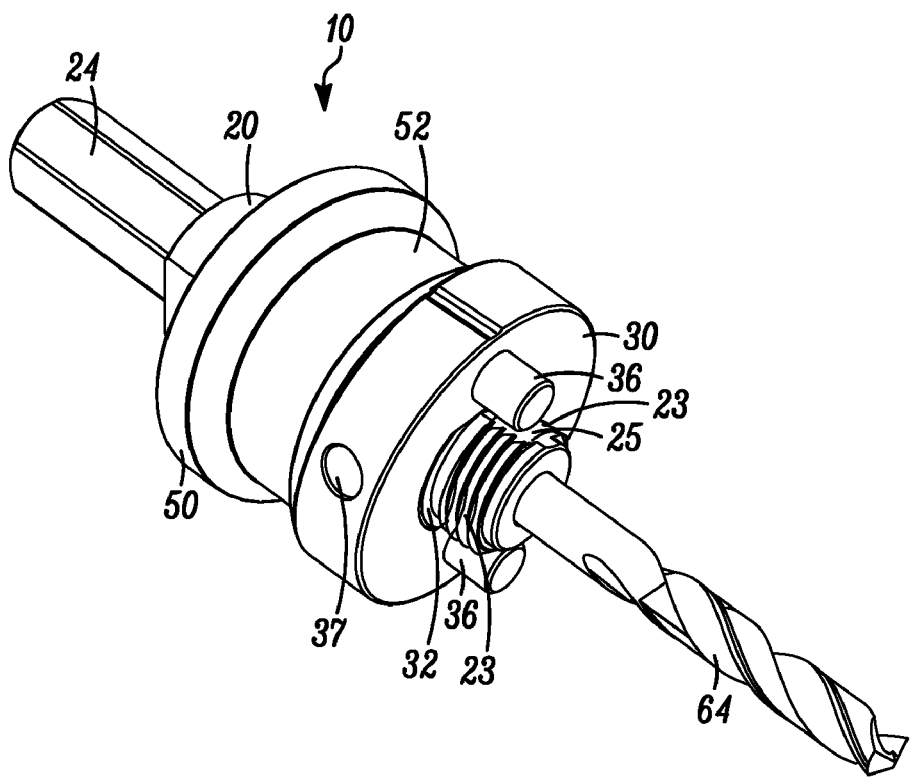
FIG. 1 is a perspective view of an arbor for a hole saw according to an embodiment of the invention.
Figure 2:
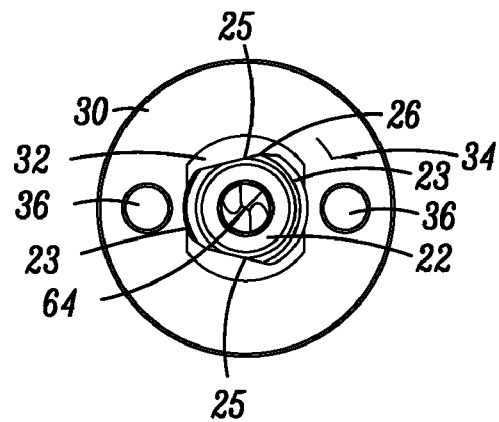
FIG. 2 is a top plan view of the arbor of FIG. 1.
Figure 14A:
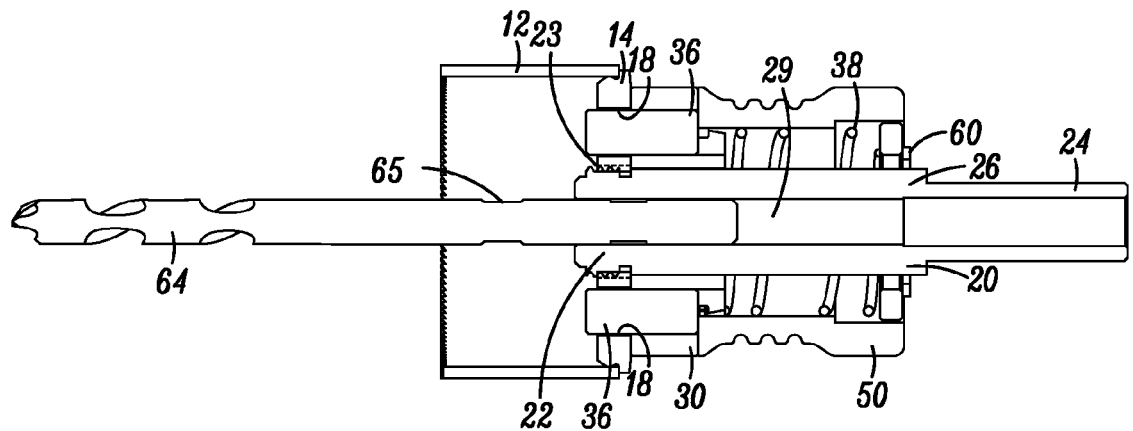
FIGS. 14A and B are cross-sectional views of the arbor of FIG. 13 showing movement of the drive pin plate between the first position (FIG. 14A) and the second position (FIG. 14B) so that the drive pins engage/disengage the corresponding drive pin apertures of the hole saw.
Figure 14B:
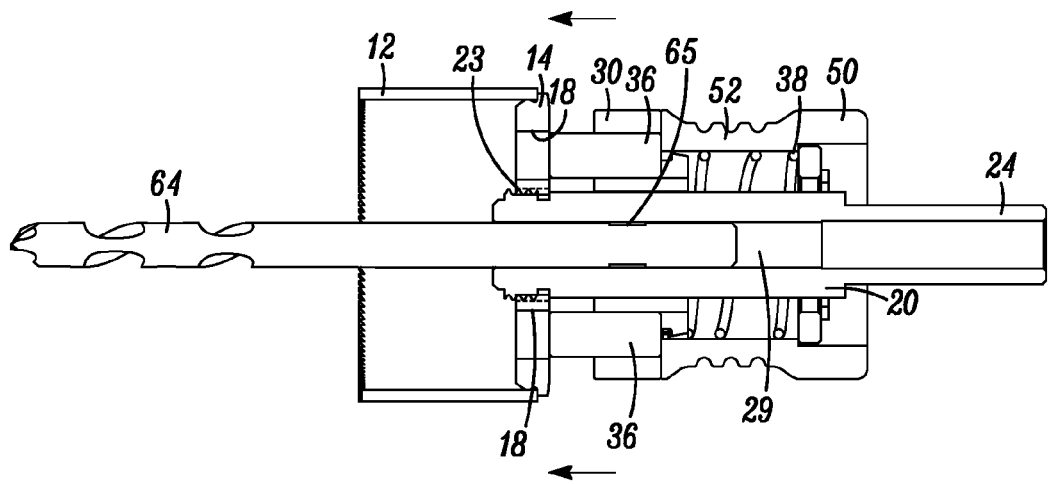

As shown typically in FIGS. 1-4 and 11-12, the arbor 10 further includes a drive pin plate or member 30 defining an aperture 32 extending therethrough. The aperture 32 is configured for receiving the arbor body 20 and engaging the body portion 26 of the arbor body such that the drive pin plate 30 is prevented from rotating relative to the arbor body, but is allowed to move axially over the arbor body between a first position engaging the hole cutter 12 (FIG. 14A), and a second position disengaged from the hole cutter 12 (FIG. 14B). As best shown in FIG. 2, the aperture 32 defines a "double D" configuration to matingly engage the body portion 26 of the arbor body 20; however, as may be recognized by those of ordinary skill in the pertinent art based on the teachings herein, this configuration is only exemplary, and numerous other shapes and/or configurations that are currently known, or that later become known equally may be used. The drive pin plate 30 further includes a first or hole cutter bearing surface 34, and a plurality of retaining members, which in the illustrated embodiment are drive pins 36. The drive pins 36 extend axially from the first surface 34, are angularly spaced relative to each other, and are radially spaced relative to the aperture 32. Each drive pin 36 is received within a corresponding drive pin aperture 18 of the hole cutter 12 when the drive pin plate 30 is in a first (engaged) position engaging the hole cutter (FIGS. 4 and 14A), and is displaced from the respective drive pin aperture 18 when the drive pin plate is in a second (disengaged) position disengaged from the hole cutter (FIG. 14B). In the illustrated embodiment, the drive pin plate 30 includes two diametrically opposed drive pins 36; however, as may be recognized by those of ordinary skill in the pertinent art base on the teachings herein, the drive pin plate 30 can take any of numerous different configurations and can include any number of drive pins 36 that can take any of numerous different configurations that are engageable with corresponding drive pin apertures 18 or other recesses in the hole cutter.

Figure 3:
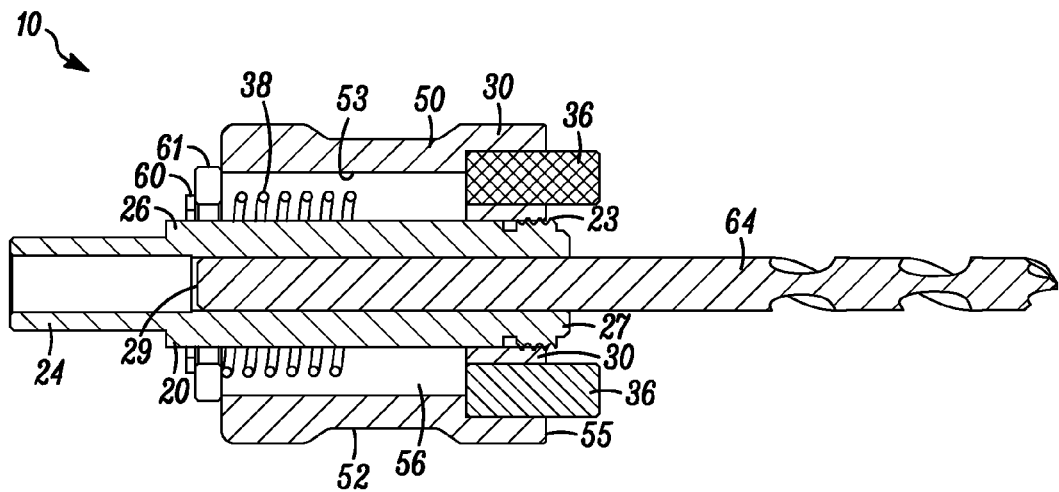
FIG. 3 is a cross-sectional view of the arbor of FIG. 1.

As shown in FIGS. 3 and 4, a biasing member 38 biases the drive pin plate 30 in the direction from the second disengaged position toward the first engaged position. As described in further detail below, the biasing member 38 normally biases the drive pin plate 30 into the first engaged position when the drive pins 36 and corresponding drive pin apertures 18 are placed in alignment, such that the drive pin plate 30 abuts the end plate 14 of the hole cutter 12, and supports the hole cutter in a manner that substantially prevents off-axis wobble and undesirable vibrations during use. One advantage of this feature is that it facilitates one-handed attachment of the hole cutter to the arbor, or otherwise facilitates rapid attachment and detachment of the hole cutter to and from the arbor.

Preferably, the arbor 10 is adapted to receive and mount both quick change hole cutters and standard hole cutters. However, the invention and aspects thereof may be embodied in arbors adapted to mount only quick change hole cutters. In a standard hole cutter (not shown), the threaded aperture in the end plate of the hole cutter (defining, for example, either a ½-20 UNF-2B thread or a ⅝-18 UNF-2B thread, depending on the outer diameter of the hole saw) threadedly engages the end portion 22 of the arbor body 20 to secure the arbor body thereto. In the quick change hole cutter 12, on the other hand, and as shown typically in FIG. 10, the aperture 16 in the end plate 14 defines a plurality of curvilinear protrusions 17 angularly spaced relative to each other along the circumference of the aperture, and a plurality of curvilinear recesses 19 located therebetween. The curvilinear protrusions 17 define female threads that threadedly engage corresponding male threads formed on the end portion 22 of the arbor body 20. More specifically, and as shown in FIGS. 5 and 7, the end portion 22 of the arbor body 20 defines a plurality of angularly extending, curvilinear arbor protrusions 23 that project radially outwardly, and are angularly spaced relative to each other about the circumference of the end portion 22, and a plurality of angularly extending recesses or flats 25 located therebetween. In the illustrated embodiment, one or more of the protrusions 23 on the arbor body 20 and the corresponding protrusions 17 on the hole cutter 12 defines a greater or lesser angular extent than the other protrusions so that the quick change hole cutter can be fitted to the end portion 22 of the arbor body in only one first engagement position, and in that first engagement position, the lead male and female threads can properly engage when moving from the first engagement position to the second engagement position. More specifically, as shown typically in FIG. 7, a first protrusion 17 on the end portion 22 of the arbor body to the left in the drawing defines a greater angular extent than the opposite second protrusion 23 located to the right in the drawing. Similarly, the hole saw cap 14 of FIG. 10 includes a first recess 19 defining a greater angular extent than the opposite second recess 19. Accordingly, in the first engagement position, the first recess 19 receives the first protrusion 23, the second recess 19 receives the second protrusion 23, and this is the only position in which the end portion 23 of the arbor can be received within the central aperture of the hole cutter. In this first engagement position, the lead threads of the respective protrusions of the arbor and hole saw engage upon moving at least one of the hole cutter and arbor body relative to the other between the first and the second engagement positions. Because of the different angular extents of the opposing threaded protrusions of the quick change hole saw cap and arbor body, 17 and 23, respectively, the end portion 22 of the arbor body can be received into the aperture 16 of the hole saw cap in only one position, and in that position, the lead male and female threads can engage upon moving the hole cutter and/or arbor body relative to the other between the first and second engagement positions. If desired, or alternatively, the hole cutter and/or arbor can include visual markings thereon that can be aligned or otherwise used to orient the position of the hole cutter aperture relative to the connecting portion of the arbor in order to ensure attachment of the hole to the arbor in the first engagement position.

Figure 11:
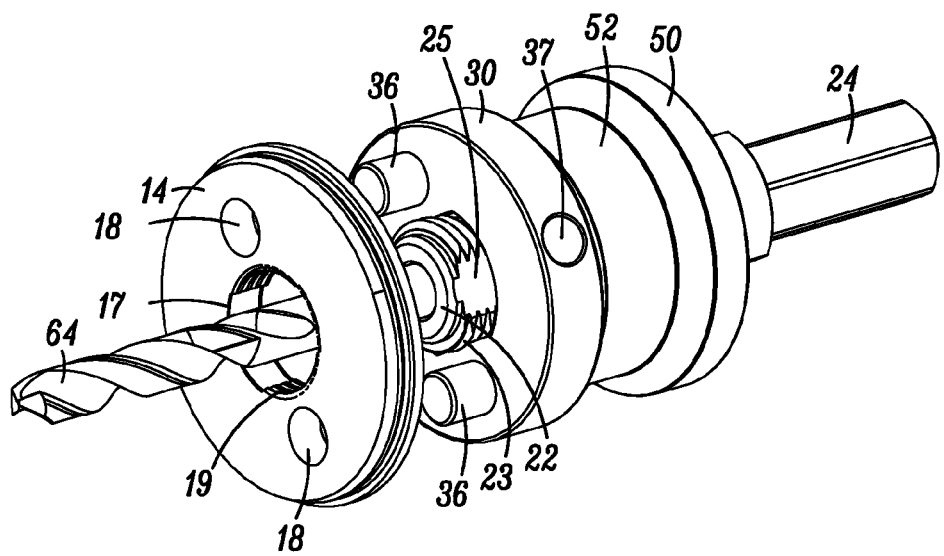
FIG. 11 is a perspective view of the arbor of FIG. 1 showing the step of aligning the hole saw aperture with the end portion of the arbor body and with parts of the hole saw removed for clarity.
Figure 12:
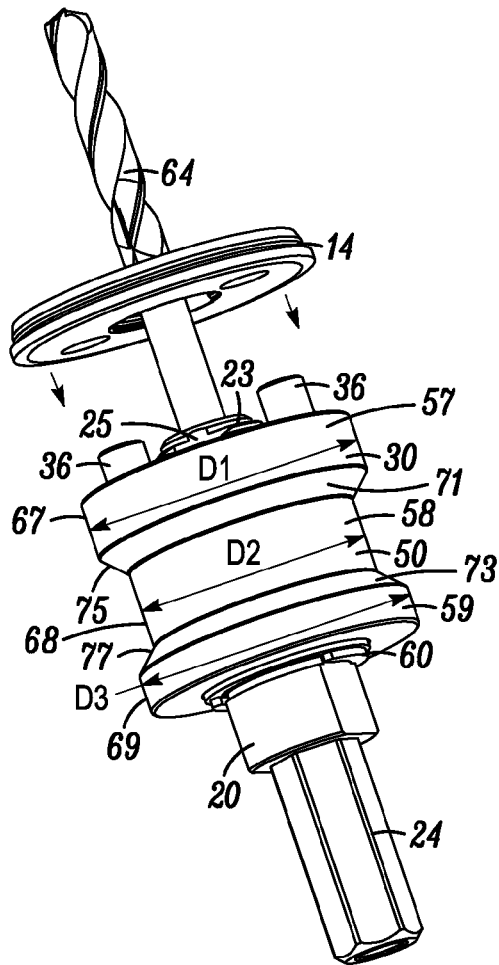
FIG. 12 is a perspective view of the arbor of FIG. 11 showing the step of moving the aligned hole saw aperture into engagement with the end portion of the arbor body.
Figure 13:
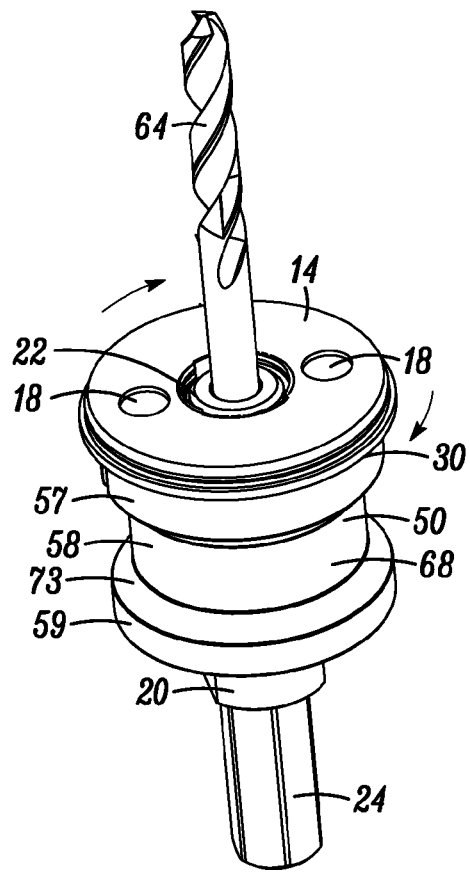
FIG. 13 is a perspective view of the arbor of FIG. 12 showing the step of rotating the hole saw to fully engage the end portion of the arbor.

As shown in FIGS. 11-13, in order to attach the hole cutter 12 to the arbor body 20, the protrusions 23 on the end portion 22 of the arbor body 20 are aligned with the correspondingly-sized recesses 19 of the hole cutter aperture 16. Then, the hole cutter 12 is slipped over the end portion 22 of the arbor body 20 (or vice versa) until the end plate 14 of the hole cutter is adjacent to, substantially in contact with, or in contact with the shoulder 28 of the arbor body 20 to thereby place the hole cutter and arbor body in the first engagement position. As indicated above, in this position, the lead male threads of the arbor body and lead female threads of the hole cutter can engage upon rotating at least one relative to the other. Then, the hole cutter 12 is rotated relative to the arbor body 20 from the first engagement position to a second engagement position (or the arbor body is rotated relative to the hole cutter, or both the hole cutter and arbor body are rotated in opposite directions) to, in turn, threadedly engage the male threaded protrusions 23 of the end portion 22 of the arbor body with the corresponding female threaded protrusions 17 of the hole cutter, and thereby fixedly secure the hole cutter to the arbor body.

In the illustrated embodiment, the male threads of the arbor body protrusions 23 and the female threads of the hole cutter protrusions 17 are configured (or "clocked") so that when the hole cutter and/or arbor body is rotated from the first engagement position to the second engagement position, the drive pins 36 of the arbor and drive pin apertures 18 of the hole cutter are substantially aligned in the second engagement position to, in turn, allow the drive pins to be axially received within the drive pin apertures and thereby further secure the hole cutter to the arbor. In addition, the male and female threads of the protrusions 23 and 17, respectively, are preferably configured so that when the hole cutter 12 and/or the arbor body 20 are rotated into the second engagement position, the end plate 14 is in contact with, or substantially in contact with the shoulder 28 of the arbor body to, in turn, allow the shoulder to engage and further support the hole cutter during use. In the illustrated embodiments of the present invention, there is sufficient axial clearance between the male and female threads of the protrusions 23 and 17, respectively, to allow the end plate 14 of the hole cutter to contact or substantially contact the shoulder 28 of the arbor body in the first engagement position, and to allow the end plate 14 of the hole cutter to remain in contact or substantial contact with the shoulder 28 during rotation between the first and second engagement positions, so that in the second engagement position, the end plate 14 is in contact with, or in substantial contact with the shoulder 28 of the arbor body. During rotation between the first and second engagement positions, the threads tend to drive the hole cutter 12 axially inwardly toward the shoulder 28 (or vice versa) and thus substantially eliminate or eliminate the axial clearance between threads in the second engagement position.

As indicated above, one advantage of the currently preferred embodiments of the present invention is that the threaded end portion 22 of the arbor is threadedly engageable with either quick change hole cutters or standard hole cutters. The combination of threaded protrusions 23 on the end portion 22 of the arbor body 20 forms an interrupted, but continuous thread pattern for engaging the female threads on a standard hole cutter as defined above (e.g., either a ½-20 UNF-2B thread or a ⅝-18 UNF-2B thread, depending on the outer diameter of the hole saw). Thus, in order to attach a standard hole cutter to the arbor body, the threaded aperture in the standard hole cutter cap is fitted over the threaded end portion 22 of the arbor body, and at least one of the hole cutter and arbor body is rotated relative to the other to engage the threads. Then, the hole cutter and/or arbor is rotated relative to the other to further engage the threads and, in turn, axially move the end cap of the hole cutter into engagement with the shoulder 28 of the arbor body (FIG. 7). In this position, if the drive pins 36 are aligned with the drive pin apertures of the standard hole cutter, then the drive pin plate is moved downwardly, or allowed to move downwardly into engagement with the end plate on the hole cutter to, in turn, receive the drive pins within the drive pin apertures. If the drive pins and drive pin apertures are not aligned in this position, then the hole saw is rotated and backed away slightly from the shoulder 28 of the arbor until the drive pin apertures and drive pins are aligned. When so aligned, the drive pin plate is moved downwardly, or allowed to move downwardly into engagement with the drive pin apertures to complete the connection of the hole cutter to the arbor.

In the currently preferred embodiments of the present invention, the relative rotation of the hole cutter 12 and/or arbor 10 between the first and second engagement positions is within the range of about 10 degrees and about 180 degrees, is preferably within the range of about 30 degrees and about 120 degrees, and is most preferably within the range of about 40 degrees and about 100 degrees. In the illustrated embodiment, the relative rotation between the first and second engagement positions is about 45 degrees. However, as may be recognized by those of ordinary skill in the pertinent art based on the teachings herein, these angular ranges and angles are only exemplary, and numerous other angles and/or angular ranges equally may be employed.

Figure 28:
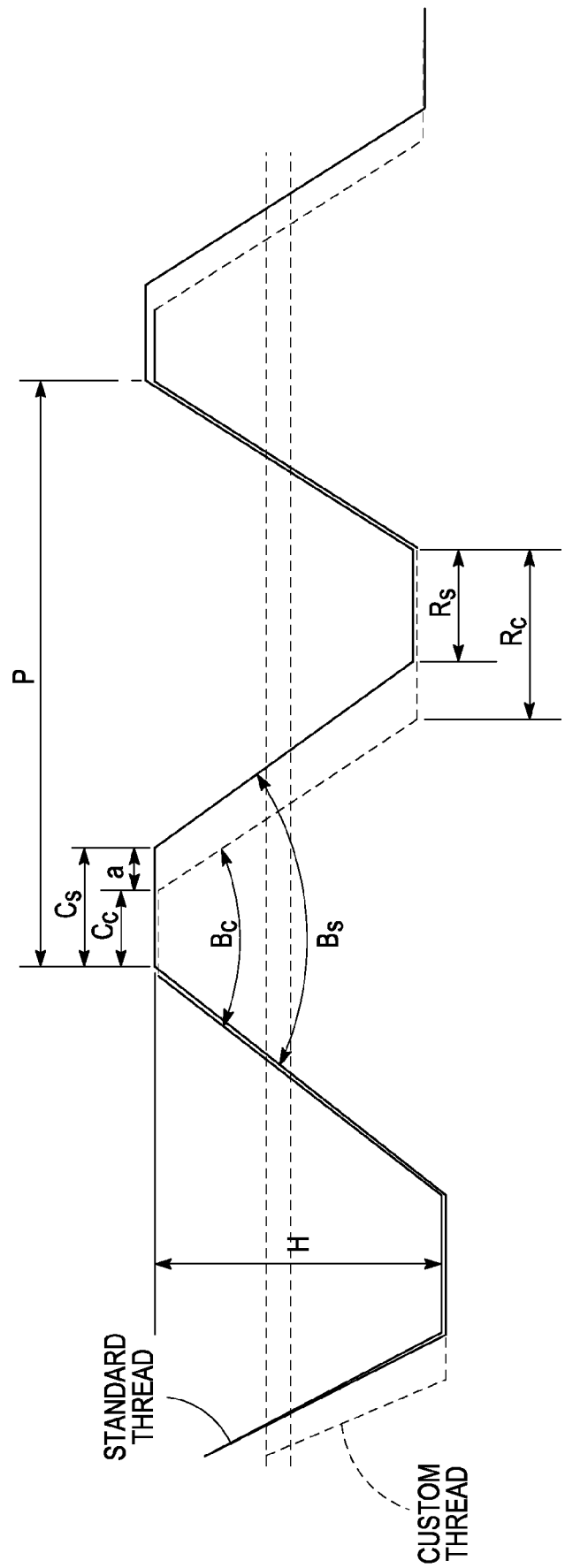
FIG. 28 is a somewhat schematic illustration of standard hole cutter thread form shown in solid lines, and a custom hole cutter thread form in accordance with the currently preferred embodiments of the present invention shown in broken lines.

As shown typically in FIG. 28, the arbors and hole cutters of the currently preferred embodiments of the present invention define custom thread forms that allow the end portions of the arbors to be threadedly engaged to both quick change hole cutters and standard hole cutters; that allow the quick change hole cutters to engage or substantially engage the shoulder of the arbor in both the first and second engagement positions; and that are timed so that in the second engagement position the drive pins of the arbor are aligned or substantially aligned with the drive pin recesses of the hole cutter. As indicated above, standard hole cutters having hole saw diameters of 1 3/16 inches or less define a ½-20 UNF-2B thread ("small diameter" hole cutters), and standard hole cutters having hole saw diameters of 1¼ inches or greater define a ⅝-18 UNF-2B thread ("large diameter" hole cutters). Accordingly, the custom thread forms of the currently preferred embodiments of the present invention are based on these standard thread forms to allow attachment of the arbor to hole cutters with such standard threads; however, the custom thread forms also vary from the standard thread forms in order to allow attachment of quick change hole cutters as described. The currently preferred embodiments of the present invention define a "½-20 custom thread" for relatively small diameter hole cutters, and a "⅝-18 custom thread" for relatively large diameter hole cutters. Each custom thread defines the same thread height "H", pitch "P", and included angle "•", as the respective standard thread form, but defines a different axial clearance "a", root "R", and crest "C". In the illustrated embodiments, the customer thread forms differ from the standard thread forms as follows:

TABLE 1

| Different Features | Standard Thread Forms | Custom Thread Forms |
| --- | --- | --- |
| Root ("R") | 0.25 P | 0.25 P + a |
| Crest ("C") | 0.125 P | 0.125 P − a |
| Axial Clearance | Not Specified, But Negligible or Approximately Zero | a |

The minimum clearance "a" for each custom thread form is preferably determined in accordance with the following formula: a=((1/pitch)/360))*D, where D equals the degree of rotation between the first and second engagement positions. For example, as indicated in the table below, if the hole cutter includes two threaded protrusions 17 (or "lobes"), it will rotate 90° between the first and second engagement positions; if the hole cutter includes 3 lobes, it will rotate 60° between the first and second engagement positions; if the hole cutter includes 4 lobes, it will rotate 45° between the first and second engagement positions, etc. The minimum axial clearance "a" is set to time the threads so that in the second engagement position the drive pins are aligned or substantially aligned with the respective drive pin recesses in the hole cutter to allow the drive pins to be moved into the engaged position. The following table lists exemplary minimum approximate clearances "a" for the ⅝-18 and ½-20 custom thread forms:

TABLE 2

| Number of Lobes (or curvilinear threaded protrusions) | Angular Rotation Between First And Second Engagement Positions | Minimum Approximate Clearance "a" for ⅝-18 Custom Thread Form (inches) | Minimum Approximate Clearance "a" for ½-20 Custom Thread Form (inches) |
| --- | --- | --- | --- |
| 2 lobe (square/rectangle) | 90° | 0.014 | 0.012 |
| 3 lobe (triangle) | 60° | 0.009 | 0.008 |
| 4 lobe (cross) | 45° | 0.007 | 0.006 |
| 5 lobe (pent) | 36° | 0.006 | 0.005 |
| 6 lobe (hex) | 30° | 0.005 | 0.004 |

As may be recognized by those of ordinary skill in the pertinent art based on the teachings herein, these minimum clearances are only exemplary, and numerous other clearances equally may be employed. Preferably, the minimum clearance "a" is approximately as defined above; however, if desired, the clearance may be greater than the minimum as defined above. In some embodiments of the present invention, the clearance is within the range of about 1 to about 1½a. If, for example, the clearance is greater than the respective minimum clearance "a", the drive pins will be allowed to move into the drive pins recesses when the hole cutter is located in the second engagement position. If, on the other hand, the clearance is too small such that the hole cutter cannot move into the second engagement position and thus cannot move the drive pin recesses into alignment with the drive pins, the hole cutter cannot be properly attached to the arbor.

Figure 16:
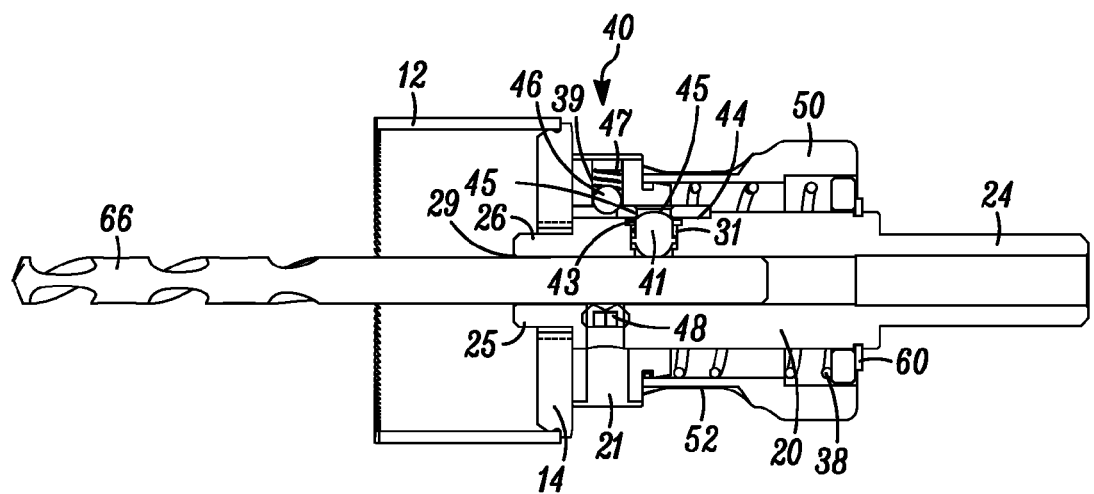
FIG. 16 is a cross-sectional view of the arbor of FIG. 1 showing the pilot bit mechanism in a second or standard pilot bit state.
Figure 17:
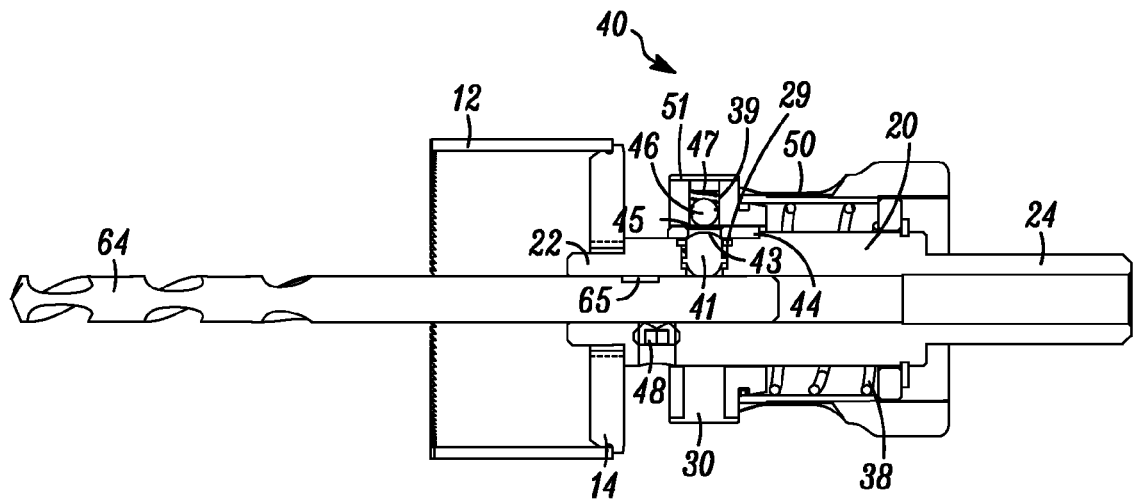
FIG. 17 is a cross-sectional view of the arbor of FIG. 1 showing the pilot bit mechanism in a third or neutral state disengaged from the pilot bit inserted therein.

As shown best in FIGS. 4 and 16-17, the arbor 10 further includes a pilot bit mechanism 40, at least a portion of which is housed in the arbor body 20 and/or a housing in the drive pin plate 30. The pilot bit mechanism 40 is designed to allow substantially automatic and/or manual engagement and disengagement of both quick change and standard pilot drill bits (FIGS. 18-19). In the illustrated embodiment, the pilot bit mechanism 40 defines a quick change pilot bit state, shown in FIG. 4, a standard pilot bit state, shown in FIG. 16, and a neutral state shown in FIG. 17. In the quick change pilot bit state shown in FIG. 4, the pilot bit mechanism 40 engages a quick change pilot bit 64 to prevent movement of, and otherwise releasably secure the bit to the arbor body 20; in the standard pilot bit state shown in FIG. 16, the pilot bit mechanism 40 engages a standard pilot bit 66 to prevent movement of, and otherwise releasably secure the bit to the arbor body 20; and in the neutral state shown in FIG. 17, the pilot bit mechanism 40 is disengaged from the respective quick change pilot bit 64 or standard pilot bit 66 (whichever one is inserted in the pilot bit aperture 29) to release, remove and/or replace the bit. As described further below, the pilot bit mechanism 40 may include a visual indicator that alerts a user when a standard pilot bit 66 is inserted in the pilot bit aperture 29.

Figure 8:
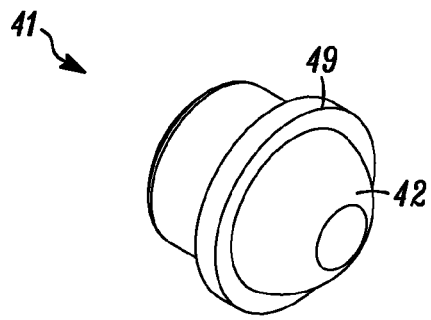
FIG. 8 is a perspective view of the pilot pin of the arbor of FIG. 1.
Figure 9:
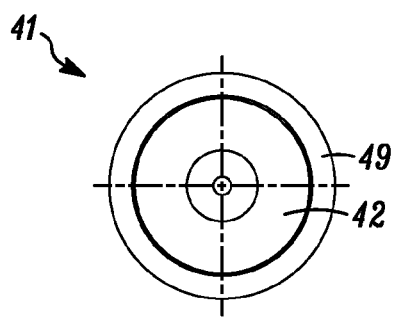
FIG. 9 is a top plan view of the pilot pin of FIG. 8.

As shown in FIGS. 4 and 16-17, the pilot bit mechanism 40 comprises a pilot pin 41 (shown separately in FIGS. 8-9) movable between a first position and a second position. The first position corresponds with the quick change pilot bit state wherein the pilot pin engages the quick change bit 64 (FIG. 4). The second position corresponds with either the standard pilot bit or neutral states wherein the pilot pin is either disengaged from the quick change bit, as shown in FIG. 17, or positioned to allow a standard bit 66 to be inserted into the arbor body 20, as shown in FIG. 16. As shown in FIG. 18, the quick change pilot bit 64 includes a shank defining at least one pilot pin engaging feature 65 such as, for example, a groove, recess, aperture, notch, indentation, external boss or protrusion. In the illustrated embodiment, the quick change bit 64 has a rectangular notch for engaging the pilot pin 41; however, as may be recognized by those of ordinary skill in the pertinent art based on the teachings herein, the quick change shank may take the form of any of numerous different types of shapes, and may include any of numerous different configurations or features that are currently known or that later become known for engaging the pilot pin. As shown best in FIG. 8, in order to universally engage the various types of quick change pilot bit shanks that are available, the pilot pin 41 has a substantially rounded tip 42. As shown in FIGS. 4 and 16-17, the pilot bit mechanism 40 includes a biasing member 43, such as a coil spring, that biases the pilot pin 42 into the first position in engagement with a pilot bit received within the pilot bit aperture 29.

As also shown in FIGS. 4 and 16-17, the pilot bit mechanism 40 further comprises a fastener 48 movable between a first position (FIG. 4) disengaged from a pilot bit received within the pilot bit aperture 29, and a second position engaged with either a quick change 64 or standard pilot bit 66 received within the pilot bit aperture 29. In the illustrated embodiment, the fastener 48 is a set screw; however, as may be recognized by those of ordinary skill in the pertinent art based on the teachings herein, the fastener may take the form of any of numerous other types of fasteners that are currently known, or that later become known for releasable securing the inserted pilot bit.

The pilot bit mechanism 40 further comprises a shear pin or ball 46 that is disposed at least partially within a ball receiving aperture 39 defined in the drive pin plate 30. The ball 46 is movable between a first position, wherein the ball 46 outwardly protrudes from the ball receiving aperture 39 when the pilot bit mechanism 40 is in the quick change pilot bit or standard pilot bit states, as shown in FIGS. 4 and 16, and a second position, wherein the ball 46 is substantially retained within the ball receiving aperture 39 when the pilot bit mechanism 40 is in the neutral state, as shown in FIG. 17. A biasing member 47 biases the ball 46 into the first position. In the illustrated embodiment, biasing members 38, 43 and 47 are coil springs; however, as may be recognized by those of ordinary skill in the pertinent art based on the teachings herein, the biasing members may take the form of any of numerous different types of biasing members that are currently known, or that later become known, such as any of numerous different types of springs or other components.

As also shown in FIGS. 4 and 16-17, the pilot bit mechanism 40 further comprises a shear plate 44 defining an aperture 45 for receiving therein the pilot pin 41 and/or ball 46 depending on the state of the pilot bit mechanism. The shear plate 44 is movable between a first position corresponding to the quick change pilot bit state shown in FIG. 4, and a second position corresponding to the standard pilot bit and neutral states of the pilot bit mechanism 40 shown in FIGS. 16-17.

The interaction between the shear pin 41, shear plate 44, ball 46, drive pin plate 30 and pilot bit (quick change bit 64 or standard bit 66) define the three states of the pilot bit mechanism. Other components of the arbor 10 may also play a role in defining the states the pilot bit mechanism; however, attention will be focused on the above-mentioned components. Referring to FIG. 17, the neutral state of the pilot bit mechanism 40 is shown. From the neutral state, the pilot bit mechanism 40 can move into either the quick change pilot bit state (FIG. 4) or the standard pilot bit state (FIG. 16) depending on the type of pilot bit being used (i.e. quick change bit 64 or standard bit 66). As noted above, the pilot bit mechanism 40 is disengaged from the pilot bit while in the neutral state, which allows for the removal or insertion of any type of pilot bit. In the neutral state, the drive pin plate 30 is in its respective second or disengaged position (FIGS. 14B and 17). In this position, the pilot pin aperture 31, the shear plate aperture 45 and the ball receiving aperture 39 are substantially aligned, allowing the pilot pin 41 and ball 46 to move freely between their respective first and second positions depending on the type of pilot bit inserted into the pilot bit aperture 29.

If a quick change pilot bit 64 is inserted into the pilot bit aperture 29, and with the drive pin plate 30 in its second or disengaged position (FIG. 17), the pilot bit mechanism 40 is positioned to transform from the neutral state to the quick change pilot bit state to engage the quick change pilot bit 64. In the quick change pilot bit state, shown in FIG. 4, the pilot pin 41 is biased inwardly by its associated biasing member 43 into the recess 65 of the quick change pilot bit 64 to secure the bit 64; accordingly, the ball 46 is biased inwardly by its associated biasing member 47 into the shear plate aperture 45, so that the ball 46 engages the shear plate 44. With the ball 46 engaging the shear plate 44, the position of the shear plate 44 is fixed relative to the drive pin plate 30 so that any movement of the drive pin plate 30 between its first and second positions causes the shear plate 44 to move between its first and second positions. To enter the quick change pilot bit state from the neutral state, the drive pin plate 30 must be moved from its second position (FIGS. 14B and 17) to its first position (FIGS. 4 and 14A), which, in turn, causes the shear plate 44 to move from its second position (FIG. 17) to its first position (FIG. 4). Once in its first position, the shear plate 44 prevents outward movement of the pilot pin 41 to thereby releasably lock the pilot pin 41 in engagement with the quick change pilot bit 64 and secure the bit in the pilot bit aperture 29.

If a standard pilot bit 66 is inserted into the pilot bit aperture 29, and with the drive pin plate 30 in its second position (FIG. 17), the pilot bit mechanism 40 is positioned to transform from the neutral state to the standard pilot bit state to engage the standard pilot bit 66. In the standard pilot bit state, shown in FIG. 16, the standard pilot bit 66 having been inserted into pilot bit aperture 29 maintains the pilot pin 41 in its second position so that a portion of the pilot pin 41 is seated within the shear plate aperture 45. In this position, the pilot pin 41 engages the shear plate 44 so that the axial position of the shear plate 44 is fixed relative to the arbor body 20. To enter the standard pilot bit state from the neutral state, the drive pin plate 30 must be moved from its second position (FIGS. 14B and 17) to its first position (FIGS. 14A and 16). However, in contrast to the quick change pilot bit state, the shear plate 44 will not move from its second position to its first position when the drive pin plate 30 is moved; instead, the shear plate 44 will remain in its second position as a result of being engaged by the pilot pin 41. In the standard pilot bit state, the ball 46 is biased into contact with the outer surface of the shear plate 44 further preventing the shear plate 44 from moving out of its second position. To fully secure the standard pilot bit 66, the fastener 48 is moved into engagement with the pilot bit 66 to secure the bit within the bit aperture 29, which in turn, maintains the pilot pin 41, shear plate 44 and ball 46 in their respective positions associated with the standard pilot bit state (FIG. 16) as described above. In one embodiment, in the standard pilot bit state, an end of the shear plate 44 protrudes visibly outwardly to provide a visual indication that a standard pilot bit is being used, and thus functions as visual alert to the user to manually engage the fastener 48 and, in turn, fixedly secure the standard pilot bit.

As shown in FIGS. 1, 3 and 12, the arbor 10 further comprises a collar 50. The collar 50 defines a peripheral, axially-extending side wall 52, a bore 53 formed on the inner side of the side wall 52, and an expanded recess 55 formed on the inner end of the bore for receiving therein the drive pin plate 30 that is fixedly secured or coupled thereto. The collar 50 is movable between first and second positions corresponding to the engaged and disengaged positions of the drive pin plate 30, respectively, so that movement of the collar from the first to the second position substantially simultaneously moves the drive pin plate 30 from the engaged to the disengaged position. The inner bore 53 of the collar 50 and the body portion 26 of the arbor body 20 define an annular, axially-extending compartment 56 for receiving and supporting therein the first biasing member 38 which, in the illustrated embodiment, is a coil spring, which biases the drive pin plate (and collar) towards the engaged position.

As shown best in FIG. 12, in the illustrated embodiment the collar is an elongated member defining a spool-like or diabolo shape. More specifically, the collar 50 defines an upper (distal) portion 57 defining a first laterally-extending diameter D1 and an outer surface 67, a middle portion 58 defining a second laterally-extending diameter D2 and an outer surface 68, and a lower (proximal) portion 59 defining a third laterally-extending diameter D3 and an outer surface 69. However, as may be recognized by those of ordinary skill in the pertinent art based on the teachings herein, the collar 50 can take on of any of numerous different shapes and configurations that are currently known or that later become known, and thus, is not limited to the spool-like or diabolo shape shown. In the illustrated embodiment, the first laterally-extending diameter D1 is approximately the same as the third laterally-extending diameter D3, and the second laterally-extending diameter D2 is smaller than the first and second laterally extending diameters, thus forming the spool-like or diabolo shape. An advantage of this shape is that it provides an improved manually engageable surface that facilitates handling during use by permitting the user to grasp the middle portion 58 of the collar 50 with, for example, an index finger and thumb of one hand, when moving the collar 50 to attach or remove a hole cutter 12. It should be noted that although the laterally-extending diameters of the upper and lower portions are approximately the same in the illustrated embodiment, in some embodiments the laterally extending diameters may differ; although such diameters preferably remain greater than the laterally-extending diameter of the middle portion.

In one embodiment of the invention, the axial length of the collar 50 is between about ½ inch to about 1⅜ inches, and in an exemplary embodiment, the axial length of the collar 50 is about 1⅕ inches. Additionally, in one embodiment of the invention, the axial length of the upper portion of the collar is between about ⅙ inch to about ½ inch, the axial length of the middle portion of the collar is between about ¼ inch to about ¾ inch, and the axial length of the lower portion of the collar is between about ⅙ inch to about ½ inch. In an exemplary embodiment, the axial length of the upper portion is about ⅓ inch, the axial length of the middle portion is about ⅖ inch, and the axial length of the lower portion is about ⅕ inch.

It should be noted that in the illustrated embodiment, the outer surfaces 67, 68, 69 of the respective upper, middle and lower portions 57, 58, 59 are substantially planar and substantially parallel to the central longitudinal axis of the arbor body 20. Further, it should be noted that the upper and lower portions of the collar 50 do not directly abut the middle portion; rather, intermediate portions 71, 73 reside between the upper portion 57 and the middle portion 58 and the lower portion 59 and the middle portion 58 respectively. The intermediate portions 71, 73 define surfaces 75, 77 that slope towards the central longitudinal axis of the arbor body—i.e., the surfaces 75, 77 slope in a direction from the upper and lower portions of the collar 57,59 toward the middle portion 58 of the collar. However, as may be recognized by those of ordinary skill in the pertinent art based on the teachings herein, the upper, middle and lower portions 57, 58, 59 of the collar 50 can take on any of numerous different configurations that are currently known or that later become known; for example, the middle portion could include a plurality of axially spaced ribs, or any of the upper, middle and lower portions could take on an arcuate, curvilinear or sloped configuration. Additionally, the upper and lower portions could directly abut the middle portion without the inclusion of the intermediate portions, or the intermediate portions could take on any of numerous different configurations that are currently known or that later become known; for example, the intermediate portions could take on an arcuate or curvilinear configuration. Further, as may be recognized by those of ordinary skill in the pertinent art based on the teachings herein, the collar 50 and drive pin plate 30 can be integrated into a single component that can take on a diabolo configuration as defined above, or can take on any of numerous different configurations that are currently known or that later become known; for example, the single collar/drive pin plate component could take on a cylindrical shape having the same laterally extending diameter throughout.

As shown best in FIGS. 3 and 12, the arbor 10 includes a retaining clip or ring 60 connectable to a groove 62 formed in the body portion 26 of the arbor body 20, a bushing 61 that engages on its end surface the clip 60, and slidably engages on its outer surface the bore 53 of the collar 50 to guide the axial movement of the collar and drive pin plate between the first engaged (FIGS. 4 and 14A) and second disengaged (FIG. 14B) positions. As can be seen, the first biasing member 38 is axially fitted between the bushing 60 and the inner end of the drive pin plate 30 to normally bias the drive pin plate (and collar) outwardly into the first engaged position. As described further below, a user can manually engage the collar 50 to retract the collar against the bias of the first biasing member 38 into the disengaged position and can, in turn, release the collar to allow the first biasing member to drive the collar and drive pin plate from the disengaged to an engaged position. Alternatively, for one-handed attachment, a user can press the hole cutter cap 14 against the drive pin plate 30 to, in turn, correspondingly compress the coil spring 38 and place the hole cutter against the shoulder 28 of the arbor in the first engagement position. Then, upon rotating the hole cutter with the same hand from the first engagement position into the second engagement position, the coil spring automatically drives the drive pin plate 30 into the engaged position with the drive pins 36 received within the drive pin apertures of the hole cutter to complete attachment of the hole cutter to the arbor.

Figure 15:
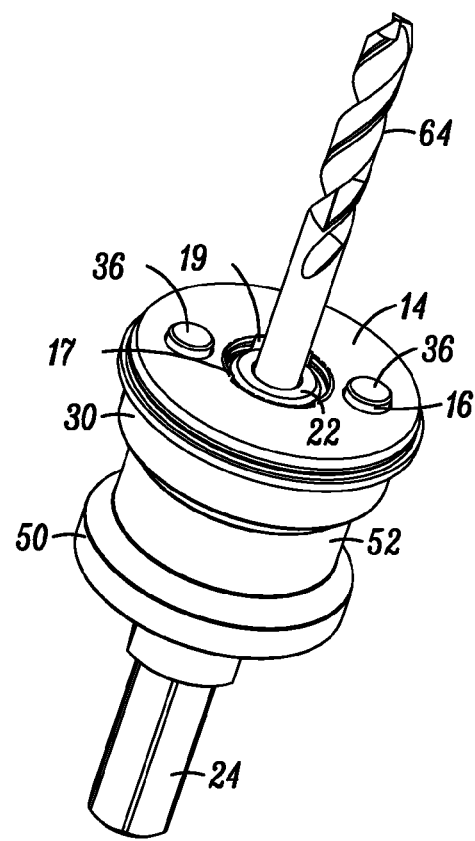
FIG. 15 is a perspective view of the arbor of FIG. 13 showing the drive pin plate engaged with the hole saw cap.

Having thus described the arbor 10 and its components, attention will now be drawn to a method of attaching and removing hole cutters and pilot drill bits to and from the arbor, respectively. With the drive shank 24 of the arbor 10 inserted and engaged by the chuck of a driving tool, such as a drill (not shown) or, prior to insertion and engagement with the tool, the end user aligns the hole cutter aperture 16 with the end portion 22 of the arbor. If a quick change hole cutter is used, the hole cutter recesses 19 are aligned with the arbor body protrusions 23 as shown, for example, in FIG. 11. Once in alignment, the hole cutter is fitted onto the end portion 22 of the arbor body 20 such that the arbor body protrusions 23 are received within the corresponding hole cutter recesses 19, and the base of the hole cutter 14 rests on or about the stop surface 28. During this step, the user substantially simultaneously moves the drive pin plate 30 from the first position to the second position and compresses the first biasing member 28 as shown, for example, in FIG. 12. Referring to FIG. 13, the hole cutter is then rotated from the first engagement position to the second engagement position such that the hole cutter protrusions 17 threadedly engage the respective arbor body protrusions 23 and, in turn, releasably secure the hole cutter to the arbor body. When the hole cutter and arbor body are in the second engagement position, the drive pin apertures 18 of the hole cutter are substantially aligned with the respective drive pins 36 of the drive pin plate 30, thereby allowing the first biasing member 38 to automatically drive the drive pin plate from the second position (FIG. 14B) to the first position (FIG. 14A) and, in turn, drive the drive pins 36 into the corresponding drive pin apertures 18 as shown, for example, in FIG. 15. With the drive pins 36 fully received into the corresponding drive pin apertures 18, the hole cutter 12 is fully engaged and attached to the arbor as shown, for example, in FIG. 4.

If a standard hole cutter (not shown) is used, the end user aligns the hole cutter aperture with the end portion 22 of the arbor body 20 fitting the hole cutter thereupon, such that the hole cutter aperture threadedly engages the threads on the arbor protrusions 23. Like the quick change hole cutter, the standard hole cutter is then rotated to threadedly attach the hole cutter to the end portion of the arbor and receive the drive pins into the corresponding drive pin apertures of the hole cutter. Depending on the threads, the standard hole cutter may not engage or may not fully engage the shoulder or stop surface of the arbor when attached to the arbor; however, since the drive pins drive the hole cutter it is not always necessary that the hole cutter cap engage the stop surface of the arbor.

To attach a quick change pilot bit 64, the drive pin plate 30 is moved from the first position engaging the hole cutter 12 to the second position disengaged from the hole cutter 12 by at least one of: (i) grasping and physically moving the drive pin plate 30, and (ii) pressing downward on the drive pin plate 30 through engagement with the hole cutter 12 during the step of fitting the hole cutter onto the end portion of the arbor body (FIG. 12). The quick change pilot bit 64 is then inserted into the pilot bit aperture 29. As the pilot bit 64 is being inserted, the pilot pin 41 moves from the first position to the second position, wherein the pilot pin 41 slides into the pilot pin aperture 31 formed in the arbor body 20 and at least a portion of the pilot pin 41 enters the shear plate aperture 45 (see, for example, FIG. 17). This allows the pilot pin 41 to exit the pilot bit aperture 29, thereby enabling full insertion of the pilot pin 64. Substantially simultaneously, the ball or pin 46 moves from the first position to the second position. In the second position, the ball 46 at least partially exits the shear plate aperture 45 and at least partially enters the ball receiving aperture 39 formed in the drive pin plate 30.

Once the quick change pilot bit 64 is substantially fully inserted into the pilot bit aperture 29, and the pilot pin 41 is in alignment with the quick change feature 65 of the pilot bit 64, the biasing member 43 returns the pilot pin 41 to the first position such that the pilot pin 41 engages the respective quick change feature 65 of the bit 64 and prevents movement of the quick change pilot bit 64 relative to the arbor body. With the pilot pin 41 engaging the quick change pilot bit 64, the biasing member 47 returns the ball 46 to the first position. In the first position, a portion of the ball 46 is received by the shear plate aperture 45 and engages the shear plate 44, while a portion of the ball remains in the shear pin aperture 31 of the arbor body 20. To fully secure the pilot bit 64, the drive pin plate 30 is then moved from the second position to the first position engaging the hole cutter by at least one of: (i) releasing the drive pin plate 30, and (ii) during the step of rotating the hole cutter, allowing the drive pin plate 30 to move when the drive pin apertures 18 align with the corresponding drive pins 36. As the drive pin plate 30 moves, the shear plate 44 substantially simultaneously moves from the second position to the first position. In the first position, the shear plate 44 locks the pilot pin 41 into engagement with the quick change pilot bit 64, and thereby prevents the pilot bit from moving out of the first position as shown, for example, in FIG. 4.

To attach a standard pilot bit 65, as with a quick change pilot bit, the drive pin plate 30 is moved from the first position engaging the hole cutter to the second position disengaged from the hole cutter by at least one of: (i) grasping and physically moving the drive pin plate 30, and (ii) pressing downward on the drive pin plate 30 through engagement with the hole cutter 12 during the step of fitting the hole cutter onto the end portion of the arbor body (FIG. 12). The standard pilot bit 66 is then inserted into the pilot bit aperture 29. As the pilot bit 66 is inserted, the pilot pin 41 moves from the first position to the second position. In the second position, the pilot pin 41 slides into the pilot pin aperture 31 in the arbor body 20 and at least a portion of the pilot pin 41 enters the shear plate aperture 45 and engages the shear plate 44 (see FIG. 16), thereby allowing the pilot pin 41 to exit the pilot pin aperture 29 and enabling full insertion of the standard pilot bit 66. Substantially simultaneously, the ball 46 moves from the first position to the second position. In the second position, the ball 46 exits the shear plate aperture 45 and enters the ball receiving aperture 39 in the drive pin plate 30.

Once the standard pilot bit 66 is substantially fully inserted into the pilot bit aperture 29, the drive pin plate 30 is then moved from the second position to the first position engaging the hole cutter by at least one of: (i) releasing the drive pin plate 30, and (ii) during the step of rotating the hole cutter, causing the drive pin plate 30 to move when the drive pin apertures 18 align with the corresponding drive pins 36. As the drive pin plate 30 moves, the shear plate 44 remains in the second position due to engagement with the pilot pin 41, which in turn, causes the ball 46 to partially extend outwardly from the ball receiving aperture 47 and into engagement with the shear plate 44 to further maintain the shear plate 44 in the second position. In one embodiment (not shown), the shear plate 44 visually protrudes from behind the drive pin plate 30 to alert the user to use the fastener 48 to engage the standard pilot pit 66, which occurs when the drive pin plate 30 is in the first position and the shear plate 44 in the second position. To fully secure the standard pilot bit 66 in the arbor 10, the user moves the fastener 48 from the first position to the second position, thereby engaging the pilot bit 66 and preventing movement thereof relative to the arbor body.

If desired, a user may employ the fastener 48 to secure a quick change pilot bit 64 in addition to the securement provided by the pilot bit mechanism 40. As may be recognized by those of ordinary skill in the pertinent art based on the teachings herein, the order in which the respective hole cutter and pilot bit are mounted is inconsequential; rather, the hole cutter may be mounted before the pilot bit, after the pilot bit, or at about the same time as the pilot bit. Additionally, if desired, the arbor can be used with the hole cutter only (no pilot bit) or with the pilot bit only (no hole cutter).

Figure 20:
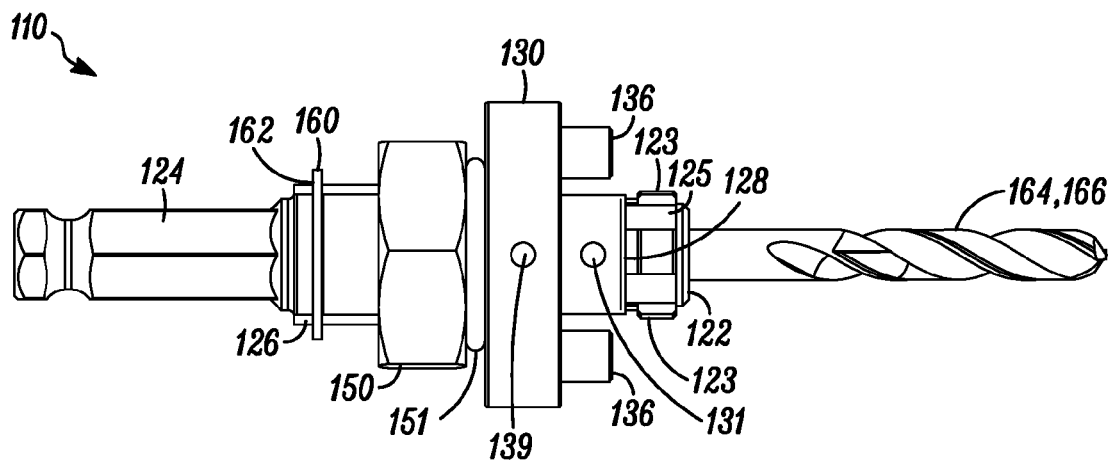
FIG. 20 is another embodiment of an arbor of the invention including a nut rotatably mounted on the arbor body for securing the axial position of the drive pin plate during use.
Figure 21:
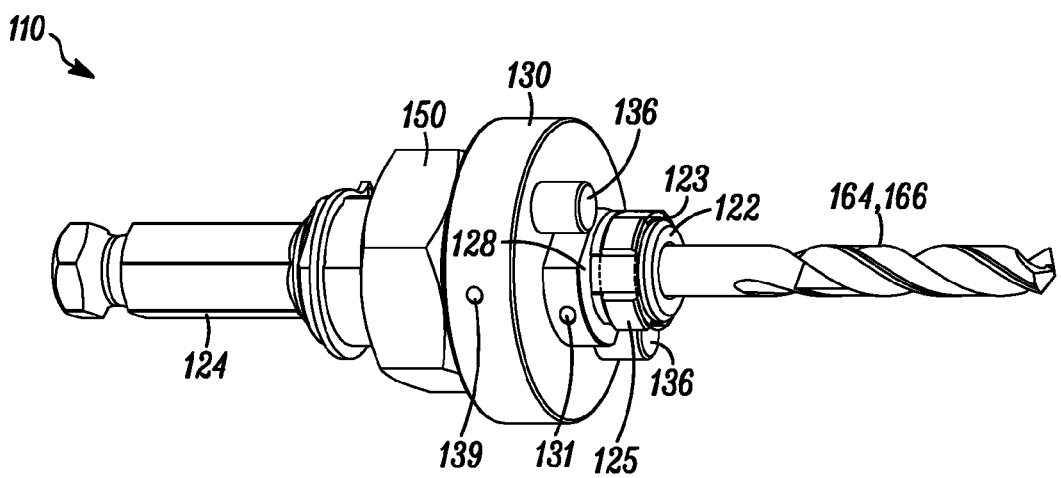
FIG. 21 is a perspective view of the arbor of FIG. 20.

In FIGS. 20 and 21 another arbor embodying the invention is indicated generally by the reference number 110. The arbor 110 is substantially similar to the arbor 10 described above in connection with FIGS. 1-19, and therefore like reference numerals preceded by the numeral "1" are used to indicate like elements. The primary difference of the arbor 110 in comparison to the arbor 10 described above, is that the arbor 110 does not include a collar 50 and biasing member 38 (see, e.g., FIGS. 1 and 3 above), but rather includes a nut 150 that threadedly engages the body portion 126 of the arbor body 120, and an o-ring 151 extending annularly about the body portion between the nut 150 and drive pin plate 130. The nut 150 is movable axially over the body portion 126 by rotating the nut to, in turn, move the nut between a first position spaced away from a hole cutter (not shown) attached to the connecting portion 122, as shown typically in FIGS. 20 and 21, and a second position engaging the drive pin plate 130 with the drive pins 136 received within the drive pin apertures of a hole saw to fixedly secure the drive pin plate to the hole saw (not shown). The o-ring 151 operates as a buffer between the nut 150 and drive pin plate 130 and otherwise allows a user to manually grip and turn the nut into engagement with the drive pin plate, and to manually grip and release the nut from the drive pin plate. In the illustrated embodiments, the nut 150 and the collar 50 prevent the drive pin plates 30, 130 from slipping off the rearward end of the arbor body 20, 120, and the threaded protrusions 23, 123 prevent the drive pin plates from slipping off the front end of the arbor body when not in use. As may be recognized by those or ordinary skill in the pertinent art based on the teachings herein, the arbors may include any of numerous different components that are currently known or that later become known for axially engaging the opposite side of the drive pin plate relative to the hole cutter to secure the axial position of the drive pin plate during use and/or to prevent the drive pin plate from slipping off the arbor body.

Figure 22:
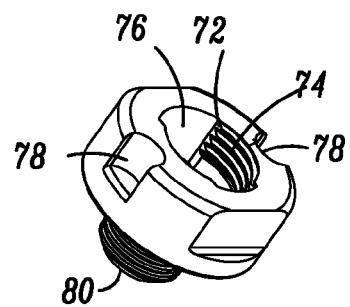
FIG. 22 is a perspective view of an adapter for connecting relatively small hole cutters to the arbors of the invention.
Figure 23:
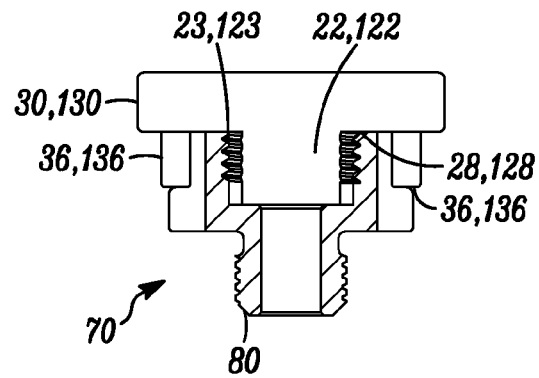
FIG. 23 is a cross-sectional view of the adapter of FIG. 22.
Figure 24:
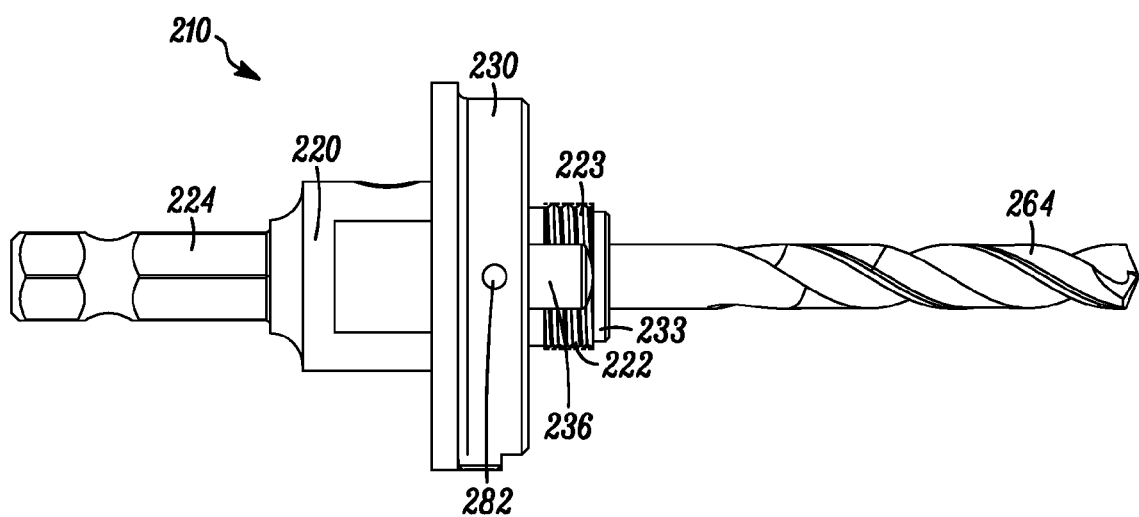
FIG. 24 is a side elevational view of another embodiment of an arbor of the invention wherein the drive pin plate is manually moved (rather than spring biased) between the engaged and disengaged positions, and including a ball detent mechanism for releasably securing the drive plate in the engaged position.

In FIGS. 22-23 an adapter for connecting relatively small hole cutters to the arbors of the invention is indicated generally by the reference numeral 70. The adapter 70 defines an adapter aperture 72 extending through an approximately central region thereof, a plurality of angularly extending protrusions 74 that project radially into the aperture 72 and are angularly spaced relative to each other about the periphery of the aperture, and a plurality of angularly extending recesses 76 formed between the protrusions 74. The protrusions 74 are threaded with a thread configuration that corresponds to and is engageable with the threaded portions 23, 123 of the end portions 22, 122 of the arbors 10, 110 for threadedly engaging the adapter to the arbors. The external periphery of the adapter 70 defines a plurality of curvilinear recesses 78 therein that are angularly spaced relative to each other about the external periphery, and are positioned relative to each other such that each recess 78 corresponds in position to, and receives therein a respective drive pin 36, 136 of the arbors when the adapter is attached to the arbor. The curvilinear shape of each recess 78 substantially conforms to the external shape of the respective drive pin to securely engage the respective drive pin and minimize any play therebetween. The underside of the adapter 70 includes a threaded boss 80 that is received within the threaded aperture on a hole cutter (not shown) to fixedly secure the hole cutter to the adapter. Accordingly, the adapter allows relatively small hole cutters that do not have drive pin apertures, or that do not have drive pin apertures that match the pattern of, or that otherwise are configured to receive the drive pins of the arbors.

In operation, the adapter 70 is attached to the hole saw by threadedly attaching the boss 80 to the hole saw. The assembled adapter and hole saw are attached to the arbor by inserting the threaded protrusions 23, 123 of the arbor end portion 22, 122 into the recesses 76 of the adapter to define the first engagement position. Then, at least one of the adapter/hole cutter assembly and arbor is rotated relative to the other to rotatably move from the first engagement position to the second engagement position. In the second engagement position, the protrusions 74 of the adapter threadedly engage the protrusions 23, 123 of the arbor to secure the adapter/hole cutter assembly to the arbor. When the adapter/hole cutter assembly and arbor are in the second engagement position, the drive pins are moved axially into the curvilinear recesses 78 to further prevent any relative rotational movement of the adapter and arbor during use and to rotatably drive the hole cutter. If desired, the axial depth of the adapter may be set so that the inner surface of the adapter engages the drive pin plate in the second engagement position. Also if desired, the threads on the threaded protrusions may define an axial clearance as described above in order to facilitate maintaining contact between the adapter and arbor shoulder 28, 128 in the first and second engagement positions.

In FIGS. 24-27 another arbor embodying the present invention is indicated generally by the reference number 210. The arbor 210 is substantially similar to the arbors 10, 110 described above, and therefore like reference numerals preceded by the numeral "2", or preceded by the numeral "2" instead of the numeral "1", are used to indicate like elements. The primary difference of the arbor 210 in comparison to the arbor 10 described above, is that the arbor 210 does not include a biasing member 38 (see, e.g., FIGS. 1 and 3 above) for biasing the drive pin plate 230 in the direction from the second disengaged position, where the drive pin plate 230 is disengaged from the hole cutter, to the first engaged position, where the drive pin plate engages the hole cutter. Rather, the drive pin plate 230 is manually moved between the engaged and disengaged positions without the aid of a biasing member, and is maintained in the first engaged position by a retaining member 280. In the illustrated embodiment, the retaining member is a ball detent mechanism, which includes a ball 284 which is movable between a retracted position and an extended position, and a biasing member 286, such as a coil spring. The biasing member 286 biases the detent member 284 in the extended position. The ball detent 280 is housed within an aperture 282 defined in the drive pin plate 230. The aperture 282 extends radially between the drive pin plate aperture 232 and the outer surface of the drive pin plate 230. A set-screw 288 is threaded into the aperture 282 to provide a backing surface against which the spring 286 can compress and serve as a mechanism for adjusting the tension in the spring 286. As may be recognized by those or ordinary skill in the pertinent art based on the teachings herein, the components of the ball detent mechanism may be substituted by any of numerous different components that are currently known or that later become known so long as the detent mechanism is able to secure the axial position of the drive pin plate relative to the arbor body during use and/or to prevent the drive pin plate from slipping out of engagement with the hole cutter. As may be recognized by those or ordinary skill in the pertinent art based on the teachings herein, the retaining member 280 can be of any of numerous types of retaining members that are currently known or that later become known to secure the axial position of the drive pin plate relative to the arbor body during use and/or to prevent the drive pin plate from slipping out of engagement with the hole cutter.

Figure 25:
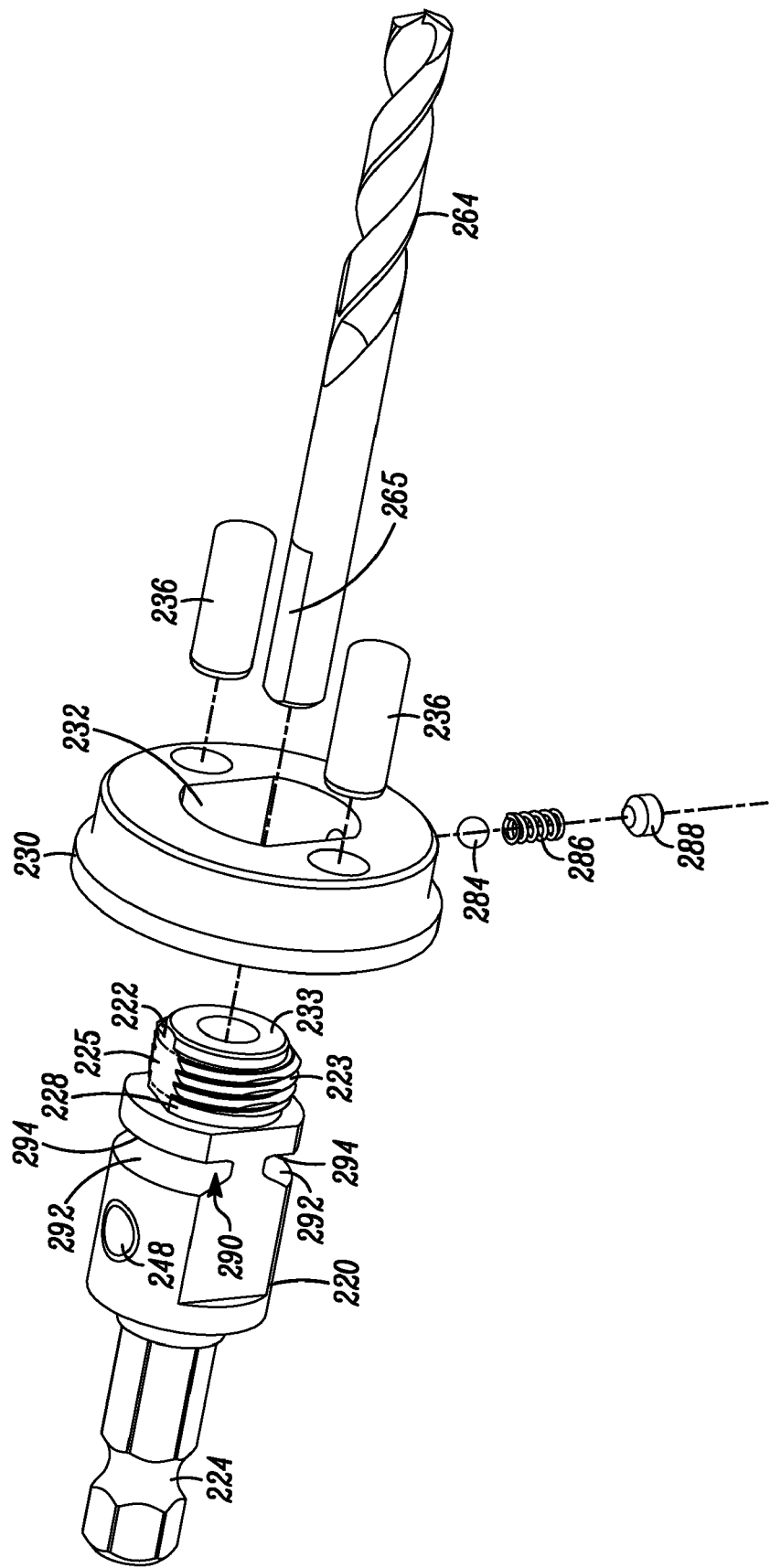
FIG. 25 is an exploded perspective view of the arbor of FIG. 24.
Figure 26:
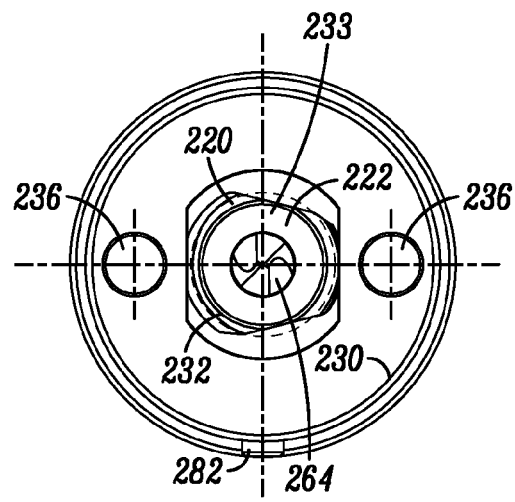
FIG. 26 is top plan view of the arbor of FIG. 24.
Figure 27:
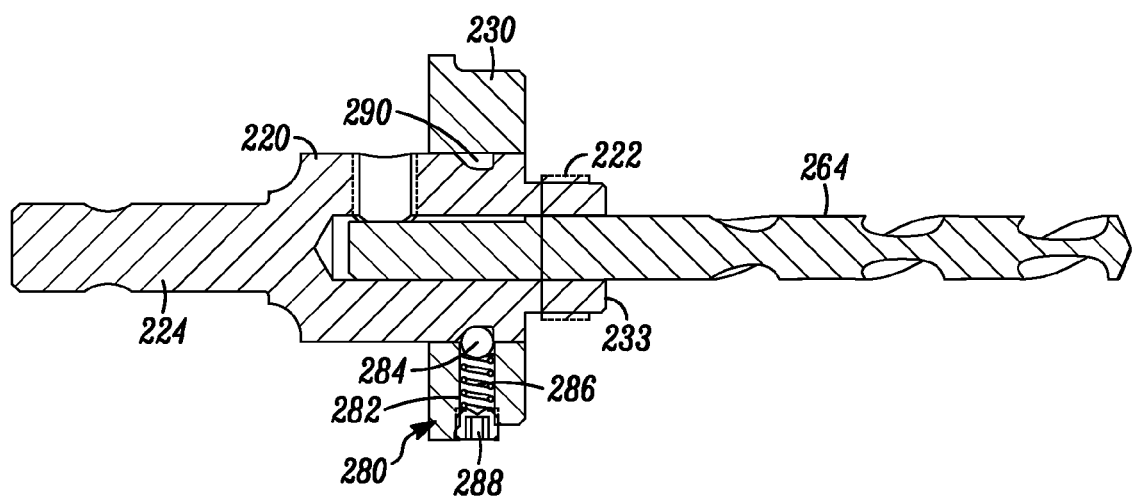
FIG. 27 is a cross-sectional view taken along line A-A of FIG. 26.

Referring to FIG. 25, the arbor body 220 defines a groove 290 located about the perimeter of the arbor body 220 towards the end portion 222. The groove 290 defines a first surface that is curved and/or angled towards the drive shank 224 and a second surface 294 that is substantially straight or substantially parallel to the end surface 233 of the connecting end portion 222. The groove 290 is configured in this manner to allow rearward movement of the drive pin plate 230 from the first engaged position to the second disengaged position, and to prevent further forward movement of the drive pin plate 230 beyond the first engaged position. As noted above, the ball 284 is movable between a retracted position and an extended position. In the extended position shown in FIG. 27, a portion of the ball 284 is seated within the groove 290 and portion of the ball is seated within the aperture 282, thereby securing the drive pin plate 230 axially in its first engaged position relative to the arbor body 220 to maintain engagement with the hole cutter. In the retracted position, the ball 284 is recessed within the aperture 282, allowing the drive pin plate 230 to move axially over the arbor body 220 and disengage from the hole cutter.

Although not shown in the drawings, the drive pin plate 230 can define a spool-like or diabolo configuration as described above, with the same or approximately the same dimensions. Further, the drive pin plate can be elongated axially (with or without defining a spool-like diabolo shape) to define an axially elongated bearing surface between the drive pin plate 230 and the arbor body 220 to reduce or prevent unwanted movement or play between the drive pin plate and arbor body.

In operation, with the drive pin plate 230 in the first engaged position (see FIGS. 24 and 27) and engaging a hole cutter (not shown), a user grasps and manually moves the drive pin plate 30 rearward towards the drive shank 24. As the drive pin plate 230 begins to move, the ball 284 is forced against the curved and/or angled surface 292 of the groove 290 and, as the drive pin plate continues its rearward movement, the ball is forced out of the groove and into its retracted position within the aperture. With the ball in its retracted position, the pilot pin plate 230 is moved to its second position disengaging the hole cutter and allowing removal of the hole cutter. If a user decides to re-attach the hole cutter, or attach a replacement hole cutter, the cutter is threaded onto the end portion 222 of the arbor body 220 as described above. The user then grasps and manually moves the drive pin plate 230 in the forward direction away from the drive shank 224 until the aperture 282 is substantially aligned with the groove 290. As this occurs, the spring 286 biases the ball 284 into its extended position, thereby securing the axial position of the drive pin plate 230 relative to the arbor body 220 and into engagement with the hole cutter.

Referring now to FIGS. 29-32, another arbor embodying the present invention is indicated generally by the reference number 310. The arbor 310 is substantially similar to the arbor 210 described above, and therefore like reference numerals preceded by the numeral "3" instead of the numerals "2" are used to indicate like elements. A primary difference of the arbor 310 in comparison to the arbor 210 is that in the arbor 310 the drive pin plate is replaced by an axially-elongated collar 350. The arbor 310 comprises an axially-elongated arbor body 320 including a drive shank 324 on one end thereof, a threaded portion 322 on an opposite end thereof relative to the drive shank 324 that is engageable with the threaded aperture on the hole cutter (not shown), and an inner axially-extending bearing surface 327 located between the drive shank 324 and the threaded portion 322. The arbor body 320 further defines a first width W, which in the illustrated embodiment is a diameter, along the inner axially-extending bearing surface 327.

Figure 29:
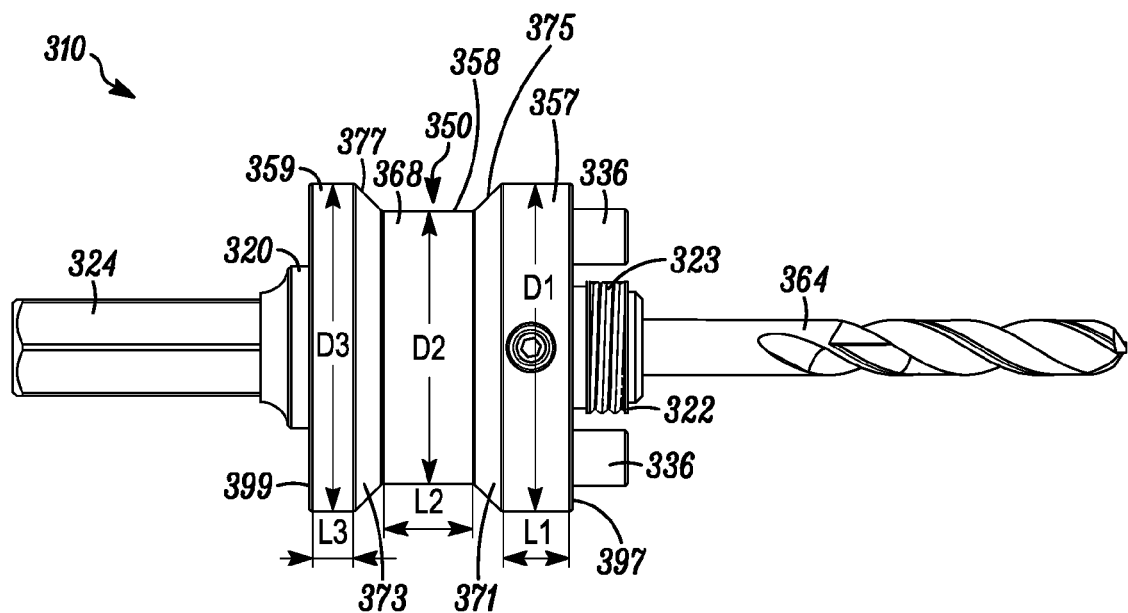
FIG. 29 is a side elevational view of another embodiment of an arbor including an axially elongated collar defining axially elongated bearing surfaces that slidably engage corresponding axially-elongated bearing surfaces of the arbor body.
Figure 31:
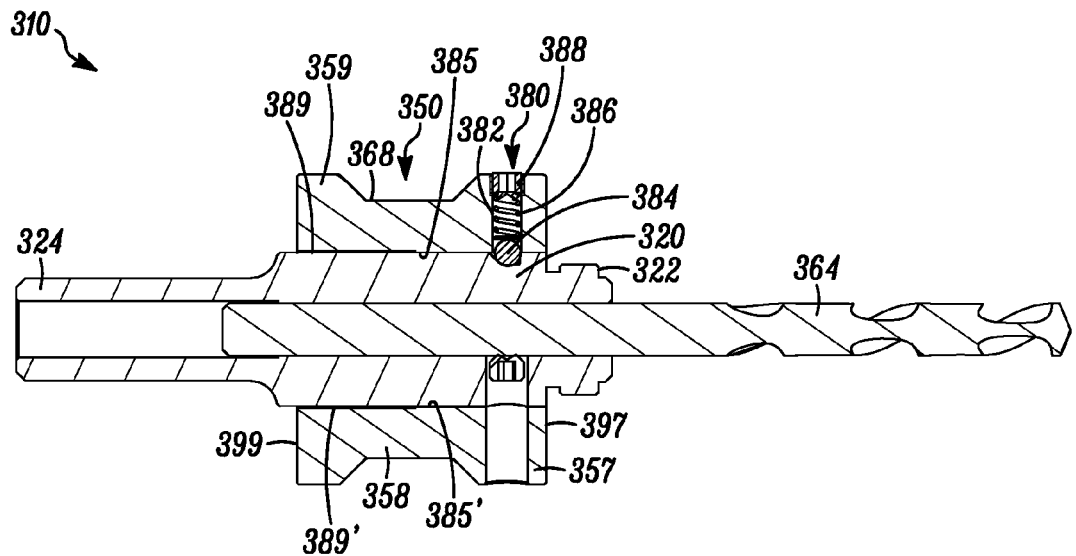
FIG. 31 is a cross-sectional view taken along line A-A of FIG. 30.
Figure 32:
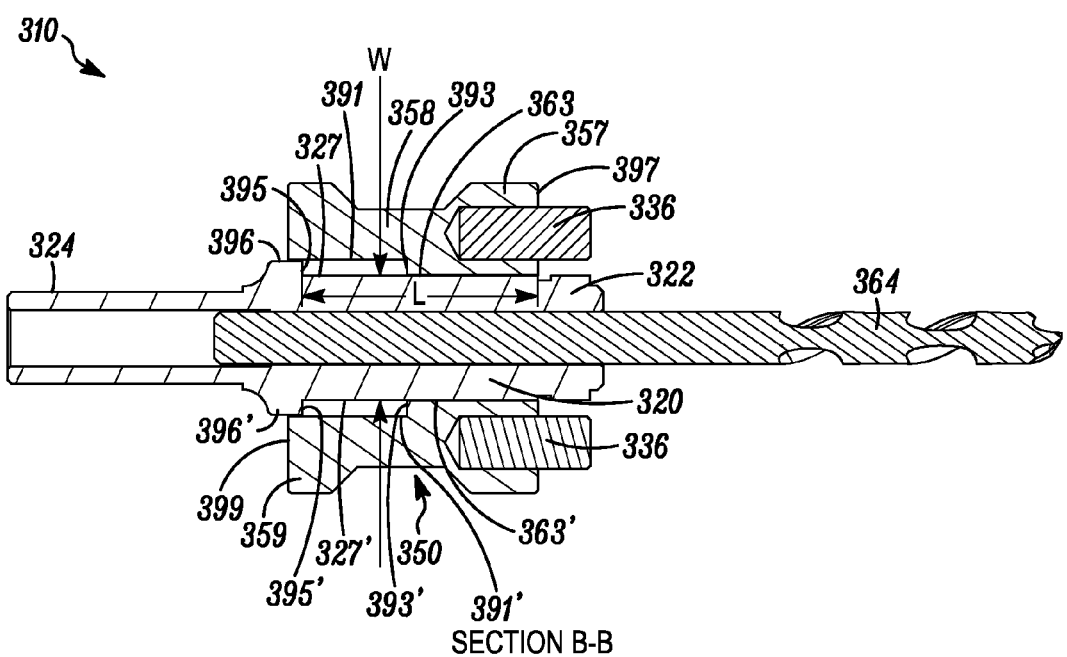
FIG. 32 is a cross-sectional view taken along line B-B of FIG. 30.

As shown in FIGS. 29, 31 and 32, the arbor 320 further comprises the aforementioned axially-elongated collar 350, which includes an upper or distal end 397, a lower or proximal end 399, and a middle portion 358 defining a manually engageable surface 368 extending axially between the proximal and distal ends. The middle portion 358 defines a reduced width or diameter D2 in comparison to the respective width or diameters D1, D3 of the proximal and distal ends. The collar 350 further includes a drive member, which in the illustrated embodiment is a pair of angularly spaced drive pins 336, extending axially from the distal end 397 of the collar 350. The collar 350 is slidably mounted on the arbor body 320 and movable between: (i) an engaged position with the distal end 397 of the collar 350 adjacent to the threaded portion 322 for engaging the drive member 336 with the drive member aperture of a hole cutter threadedly attached to the threaded portion 322 of the arbor body 320, and (ii) a disengaged position with the distal end 397 of the collar 350 axially spaced relative to the threaded portion 322 of the arbor body 320. The collar 350 further defines an outer axially-extending bearing surface 363 that slidably contacts the inner axially-extending bearing surface 327 of the arbor body 320 when moving the collar between the engaged and disengaged positions. In the illustrated embodiment, the inner axially-extending bearing surface 327 defines a length L that is at least about 1¼ times the first width W of the arbor body; and preferably the axially-extending bearing surface defines a length L that is at least about 1½ times the first width W of the arbor body.

In the illustrated embodiment, best shown in FIGS. 31-32, the arbor body 320 defines a pair of inner axially-extending bearing surfaces 327, 327' angularly spaced relative to each other, and a pair of inner curvilinear axially-extending bearing surfaces 385, 385' angularly spaced relative to each other between the inner axially-extending bearing surfaces 327, 327'. Additionally, the collar 350 defines a pair of outer axially-extending bearing surfaces 363, 363' angularly spaced relative to each other, and a pair of outer curvilinear axially-extending bearing surfaces 389, 389' angularly spaced relative to each other between the outer axially-extending bearing surfaces 363, 363'. The pair of inner axially-extending bearing surfaces 327, 327' slidably engage the pair of outer axially-extending bearing surfaces 363, 363', and the pair of inner curvilinear axially-extending bearing surfaces 385, 385' slidably engage the pair of outer curvilinear axially-extending bearing surfaces 389, 389', when moving the collar 350 between the engaged and disengaged positions. In the illustrated embodiment, the pair of inner axially-extending bearing surfaces 377, 327' are substantially flat and are located on substantially opposite sides of the arbor body 320 relative to each other, and the pair of outer axially-extending bearing surfaces 363, 363' are substantially flat and are located on substantially opposite sides of the collar 350 relative to each other. However, as may be recognized by one skilled in the art based on the teachings herein, surfaces 327, 327', 363, 363' can take on any of numerous different configurations that are currently known or that later become known; for example, the surfaces could include a plurality of mating protrusions and recesses, and the surfaces need not be located on substantially opposite sides of the arbor body and collar respectively.

In the illustrated embodiment, each curvilinear axially-extending bearing surface 385, 385', 389, 389' is defined by a diameter of the collar 350 or arbor body 320, respectively. Also in the illustrated embodiment, the outer axially-extending bearing surfaces 363, 363' are shorter than the inner axially-extending bearing surfaces 327, 327'. The collar 350 defines a pair of axially-extending recessed surfaces 391, 391' located on substantially opposite sides of the collar relative to each other, and each recessed surface 391, 391' extends between a respective axially-extending bearing surface 363, 363' and the proximal end 399 of the collar. The collar 350 further defines a pair of first stop surfaces 393, 393'. Each first stop surface 393, 393' is formed between an axially-extending recessed surface 391, 391' and a respective outer axially-extending bearing surface 363, 363'. Additionally, the arbor body 320 defines a pair of second stop surfaces 395, 395'. Each second stop surface 395, 395' is formed at a proximal end of a respective inner axially-extending bearing surface 327, 327'. The first and second stop surfaces are configured to engage each other when the collar 350 is in the disengaged position to prevent further proximal axial movement of the collar 350. The second stop surfaces 395, 395' are defined by respective lips 396, 396' formed on the arbor body 320, and the lips 396, 396' and recessed surfaces 391, 391' form bearing surfaces that slidably contact each other when moving the collar 350 between the engaged and disengaged positions.

As shown in FIG. 29, the collar 350 further defines a distal rim 357 at the distal end 397 of the collar, a proximal rim 359 at the proximal end 399 of the collar, and an annular manually engageable surface 368 extending between the proximal and distal rims. In the illustrated embodiment, the distal and proximal rims 357, 359 are defined by a first diameter (D1 or D3), and the manually engageable surface 368 is defined by a second diameter D2 that is less than the first diameter (D1 or D3). Preferably, the second diameter D2 is within the range of about 70% to about 95% of the first diameter (D1 or D3); and most preferably, the second diameter D2 is within the range of about 80% to about 90% of the first diameter (D1 or D3). Also in the illustrated embodiment, the proximal and distal rims are substantially defined by the first diameter (i.e. D1 equals D3). As may be recognized by those of ordinary skill in the pertinent art based on the teachings herein, these dimensions, and the specific shapes and configurations illustrated are only exemplary, and may be changes as desired or otherwise required.

As shown in FIG. 29, the manually engageable surface 368 defines an axial length L2, and the proximal and distal rims each define an axial length (L1 and L3, respectively), and the axial length of the manually engageable surface L2 is greater than the axial length of each of the proximal and distal rims L1, L3. Preferably, the axial length L2 of the manually engageable surface is about 30% to about 60% greater than the axial length of each of the proximal and distal rims L1, L3.

Figure 30:
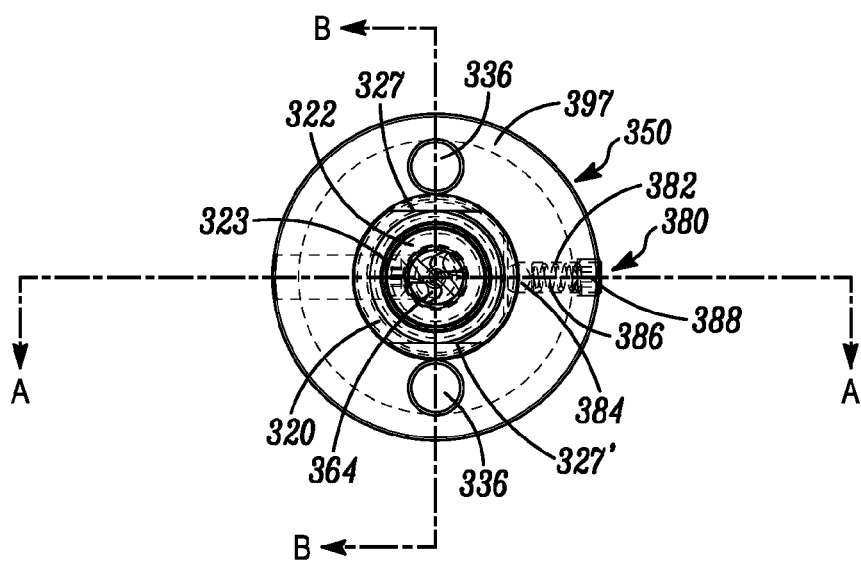
FIG. 30 is a top plan view of the arbor of FIG. 29.

Drawing attention to FIGS. 30 and 31, the arbor 310 further comprises a retaining member 380 mounted on the collar 350 and movable between (i) a first position holding the collar 350 in the engaged position, and (ii) a second position allowing axial movement of the collar 350 from the engaged position to the disengaged position. In the illustrated embodiment, the retaining member 380 is a ball detent mechanism similar to the mechanism 280 described above. However, as may be recognized by those of ordinary skill in the pertinent art based on the teachings herein, the retaining member 380 can be of any of numerous different types of retaining members that are currently known or that later become known to retain the axial position of the collar 350 relative to the arbor body 320 and/or to prevent the collar 350 from slipping out of engagement with the hole cutter (not shown) during use.

As may be recognized by those of ordinary skill in the pertinent art based on the teachings herein, numerous changes and modifications may be made to the above-described and other embodiments of the present invention without departing from the scope of the invention as defined in the appended claims. For example, the components of the arbor may take on any of numerous different configurations, or may be formed of any of numerous different materials, that are currently known, or that later become known; any of a variety of the disclosed components may be eliminated, or additional components or features may be added; and the arbors may be used with any of numerous different types of tools that are currently known, or that later become known. For example, the retaining members may can be of any of numerous different types that are currently known or that later become known, such as, for example, cylindrical or tapered drive pins, that engage corresponding apertures on a hole cutter, or drive dogs defining flats that engage corresponding apertures or recesses on the hole cutter. Similarly, the drive pin apertures or recesses can take any of numerous different configurations for receiving or otherwise engaging any of numerous different types of drive members. The drive pin member or plate can likewise can take any of numerous different configurations, including, for example, a plate form or a circular or other shaped collar or housing that is movable relative to the arbor body and includes one or more drive pins. The threads on the arbor connecting portion and/or on the central aperture of the hole cutter can take the form of the standard or timed threads (or combinations thereof) as described above, or can take the form of any of numerous different thread configurations that are currently known, or that later become known. Alternatively, the connecting portion and/or central aperture of the hole cutter may define a structure other than threads for engaging the hole cutter to the arbor upon moving the arbor and/or hole cutter relative to the other between the first and second engagement positions. Furthermore, as may be recognized by those or ordinary skill in the pertinent art based on the teachings herein, the retaining member can be of any of numerous types of retaining members that are currently known or that later become known to secure or otherwise return the axial position of the drive pin plate and/or collar relative to the arbor body during use and/or to prevent the drive pin plate and/or collar from slipping out of engagement with the hole cutter; additionally, more than one retaining member could be employed. Accordingly, this detailed description of the currently-preferred embodiments is to be taken in an illustrative, as opposed to a limiting sense.

What is claimed is:

1. An arbor for a hole cutter including an outer surface defining a threaded aperture, and a drive member aperture spaced radially relative to the threaded aperture, the arbor comprising:
   an axially-elongated arbor body including a drive shank on one end thereof, a threaded portion on an opposite end thereof relative to the drive shank that is engageable with the threaded aperture on the hole cutter, and an inner axially-extending bearing surface located between the drive shank and the threaded portion, wherein the arbor body defines a first width along the inner axially-extending bearing surface;
   an axially-elongated collar including a proximal end and a distal end, a manually engageable surface extending axially between the proximal and distal ends and defining a reduced width in comparison to the proximal and distal ends, and a drive member extending axially from the distal end of the collar, wherein the collar is slidably mounted on the arbor body and movable between (i) an engaged position with the distal end of the collar adjacent to the threaded portion for engaging the drive member with the drive member aperture of a hole cutter threadedly attached to the threaded portion of the arbor body, and (ii) a disengaged position with the distal end of the collar axially spaced relative to the threaded portion of the arbor body, wherein the collar includes an outer axially-extending bearing surface that slidably contacts the inner axially-extending bearing surface of the arbor when moving the collar between the engaged and disengaged positions, and the inner axially-extending bearing surface defines a length that is at least about 1¼ times the first width of the arbor body; and
   a retaining member mounted on the collar and movable between (i) a first position holding the collar in the engaged position, and (ii) a second position allowing axial movement of the collar from the engaged position to the disengaged position.

2. An arbor as defined in claim 1, wherein the axially-extending bearing surface defines a length that is at least about 1½ times the first width of the arbor body.

3. An arbor as defined in claim 1, wherein the first width is defined by an outer diameter of the arbor body.

4. An arbor as defined in claim 1, wherein the arbor body defines a pair of inner axially-extending bearing surfaces angularly spaced relative to each other, and a pair of inner curvilinear axially-extending bearing surfaces angularly spaced relative to each other between inner axially-extending bearing surfaces, and the collar defines a pair of outer axially-extending bearing surfaces angularly spaced relative to each other, and a pair of outer curvilinear axially-extending bearing surfaces angularly spaced relative to each other between outer axially-extending bearing surfaces, wherein the pair of inner axially-extending bearing surfaces slidably engage the pair of outer axially-extending bearing surfaces, and the pair of inner curvilinear axially-extending bearing surfaces slidably engage the pair of outer curvilinear axially-extending bearing surfaces, when moving the collar between the engaged and disengaged positions.

5. An arbor as defined in claim 4, wherein the pair of inner axially-extending bearing surfaces are located on substantially opposite sides of the arbor body relative to each other, and the pair of outer axially-extending bearing surfaces are located on substantially opposite sides of the collar relative to each other.

6. An arbor as defined in claim 5, wherein the pair of inner axially-extending bearing surfaces are substantially flat, and the pair of outer axially-extending bearing surfaces are substantially flat.

7. An arbor as defined in claim 6, wherein each curvilinear axially-extending bearing surface is defined by a diameter of the collar or arbor body, respectively.

8. An arbor as defined in claim 6, wherein the outer axially-extending bearing surfaces are shorter than the inner axially-extending bearing surfaces.

9. An arbor as defined in claim 8, wherein the collar defines a pair of axially-extending recessed surfaces located on substantially opposite sides of the collar relative to each other, and each recessed surface extends between a respective outer axially-extending bearing surface and the proximal end of the collar.

10. An arbor as defined in claim 9, wherein the collar further defines a pair of first stop surfaces, each first stop surface is formed between an axially-extending recessed surface and respective outer axially-extending bearing surface, the arbor body defines a pair of second stop surfaces, each second stop surface is formed at a proximal end of a respective inner axially-extending bearing surface, and first and second stop surfaces engage each other in the disengaged position to prevent further proximal axial movement of the collar.

11. An arbor as defined in claim 10, wherein the second stop surfaces are defined by respective lips formed on the arbor body, and the lips and recessed surfaces form bearing surfaces that slidably contact each other when moving the collar between the engaged and disengaged positions.

12. An arbor as defined in claim 1, wherein the retaining member is a ball located on one of the collar and arbor, and a corresponding detent located on the other of the collar and arbor, and wherein the ball is received within the detent in the first position to hold the collar in the engaged position.

13. An arbor as defined in claim 12, further comprising a spring that biases the ball into the first position.

14. An arbor as defined in claim 13, wherein the spring and ball are mounted adjacent to the distal end of the collar, and the detent is formed on the arbor body proximal to the threaded portion.

15. An arbor as defined in claim 1, wherein the collar defines a proximal rim at the proximal end of the collar, a distal rim at the distal end of the collar, and an annular manually engageable surface extending between the proximal and distal rims.

16. An arbor as defined in claim 15, wherein at least one of the proximal and distal rims is defined by a first diameter, and the manually engageable surface is defined by a second diameter less than the first diameter.

17. An arbor as defined in claim 16, wherein the second diameter is within the range of about 70% to about 95% of the first diameter.

18. An arbor as defined in claim 17, wherein the second diameter is within the range of about 80% to about 90% of the first diameter.

19. An arbor as defined in claim 17, wherein both the proximal and distal rims are substantially defined by the first diameter.

20. An arbor as defined in claim 17, wherein the manually engageable surface defines an axial length, and the proximal and distal rims each define an axial length, and the axial length of the manually engageable surface is greater than the axial length of each of the proximal and distal rims.

21. An arbor as defined in claim 20, wherein the axial length of the manually engageable surface is about 30% to about 60% greater than the axial length of each of the proximal and distal rims.

22. An arbor for a hole cutter including an outer surface defining a threaded aperture, and a drive aperture spaced radially relative to the threaded aperture, the arbor comprising:
- an axially-elongated arbor body including first means on one end thereof for rotatably driving the arbor body, second means on an opposite end thereof relative to the first means for threadedly engaging the arbor body to the threaded aperture on the hole cutter, and an inner axially-extending bearing surface located between the first and second means, wherein the arbor body defines a first width along the inner axially-extending bearing surface;
- third means for manually engaging and slidably moving on the arbor body between (i) an engaged position for engaging and driving the hole saw attached to the arbor body, and (ii) a disengaged position for threadedly detaching the hole saw from, or threadedly attaching the hole saw to the arbor body, wherein the third means includes a proximal end and a distal end, a manually engageable surface extending axially between the proximal and distal ends and defining a reduced width in comparison to the proximal and distal ends, fourth means extending axially from the distal end of the third means for receipt within the drive aperture of the hole saw and for rotatably driving the hole saw with the third means, and an outer axially-extending bearing surface that slidably contacts the inner axially-extending bearing surface of the arbor body when moving the third means between the engaged and disengaged positions, and wherein the inner axially-extending bearing surface defines a length that is at least about 1¼ times the first width of the arbor body; and
- fifth means mounted on the third means and movable between (i) a first position for holding the third means in the engaged position, and (ii) a second position allowing axial movement of the third means from the engaged position to the disengaged position.

23. An arbor as defined in claim 22, wherein the first means is a drive shank, the second means is a threaded boss, the third means is a collar, the fourth means is a pair of drive pins mounted on the collar, and the fifth means is a ball and detent.

* * * * *